US012477551B2

(12) United States Patent
Xu et al.

(10) Patent No.: US 12,477,551 B2
(45) Date of Patent: Nov. 18, 2025

(54) DATA TRANSMISSION METHOD AND APPARATUS BASED ON A RECEIVED RRC SIGNALING INDICATING A HYBRID AUTOMATIC REPEAT REQUEST (HARQ) FUNCTION OF A HARQ PROCESS ASSOCIATED WITH A CONFIGURED GRANT IS ENABLED OR DISABLED

(71) Applicant: HUAWEI TECHNOLOGIES CO., LTD., Shenzhen (CN)

(72) Inventors: Bin Xu, Beijing (CN); Baokun Shan, Shenzhen (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 520 days.

(21) Appl. No.: 17/869,274

(22) Filed: Jul. 20, 2022

(65) Prior Publication Data
US 2022/0361233 A1 Nov. 10, 2022

Related U.S. Application Data

(63) Continuation of application No. PCT/CN2020/074037, filed on Jan. 23, 2020.

(51) Int. Cl.
*H04L 1/1812* (2023.01)
*H04W 72/1263* (2023.01)
(Continued)

(52) U.S. Cl.
CPC ........... *H04W 72/23* (2023.01); *H04L 1/1812* (2013.01); *H04W 72/1263* (2013.01);
(Continued)

(58) Field of Classification Search
CPC .............. H04L 1/1812; H04W 72/231; H04W 72/1294; H04W 72/14; H04W 72/232
See application file for complete search history.

(56) References Cited

U.S. PATENT DOCUMENTS

2015/0312959 A1* 10/2015 Kanamarlapudi .... H04W 76/28
370/329
2018/0352471 A1 12/2018 Benammar et al.
(Continued)

FOREIGN PATENT DOCUMENTS

CN 107736049 A 2/2018
CN 108141877 A 6/2018
(Continued)

OTHER PUBLICATIONS

R1-1904551, "Harq consideration for NTN", Apr. 8-12, 2019, pp. 1-2 (Year: 2019).*
(Continued)

*Primary Examiner* — Salvador E Rivas
(74) *Attorney, Agent, or Firm* — HAUPTMAN HAM, LLP

(57) ABSTRACT

A data transmission method includes receiving first information. The first information is useable to indicate that a hybrid automatic repeat request (HARQ) function of a HARQ process associated with a first configured grant is enabled or disabled. The first configured grant is configured by radio resource control (RRC) signaling. The method further includes performing data transmission by the first configured grant based on the first information.

15 Claims, 9 Drawing Sheets

(51) Int. Cl.
  *H04W 72/23* (2023.01)
  *H04W 72/231* (2023.01)
  *H04W 72/566* (2023.01)
  *H04W 76/20* (2018.01)

(52) U.S. Cl.
  CPC ....... *H04W 72/231* (2023.01); *H04W 72/569* (2023.01); *H04W 76/20* (2018.02)

(56) References Cited

U.S. PATENT DOCUMENTS

| | | | | |
|---|---|---|---|---|
| 2020/0336255 | A1* | 10/2020 | Wong | H04W 72/0446 |
| 2021/0227465 | A1* | 7/2021 | Kung | H04W 76/28 |
| 2022/0264608 | A1* | 8/2022 | Bae | H04L 5/0053 |
| 2022/0272726 | A1* | 8/2022 | Wang | H04L 1/1812 |
| 2023/0036584 | A1* | 2/2023 | Lee | H04L 1/1854 |

FOREIGN PATENT DOCUMENTS

| | | |
|---|---|---|
| WO | 2016086405 A1 | 6/2016 |
| WO | 2019160737 A1 | 8/2019 |

OTHER PUBLICATIONS

R1-1904859, "Discussion on HARQ for NTN", Apr. 8-12, 2019, pp. 1-5 (Year: 2019).*

R1-1905733, "Summary Delay-tolerant re-transmission mechanisms in NR-NTN", Apr. 8-12, 2019, pp. 1-7 (Year: 2019).*

CMCC et al., "Further consideration on HARQ configuration in NTN", 3GPP TSG-RAN WG2 Meeting 107bis R2-1913173, Oct. 18, 2019, total 4 pages.

Ericsson, "Feature lead summary #5 on Resource allocation for NR sidelink Mode 1", 3GPP TSG-RAN WG1 Meeting #97 R1-1907947, May 17, 2019, total 24 pages.

3GPP TR 38.821 V1.0.0: 3rd Generation Partnership Project; Technical Specification Group Radio Access Network; Solutions for NR to support non-terrestrial networks (NTN) (Release 16), Dec. 2019, total 143 pages.

International Search Report issued in corresponding International Application No. PCT/CN2020/074037, dated Oct. 28, 2020, pp. 1-8.

OPPO, Discussion on CG and SPS in NTN. 3GPP TSG-RAN WG2 Meeting #108, Reno, USA, Nov. 18-22, 2019, R2-1915166, 3 pages.

Sony, Discussion on delay-tolerant HARQ for NTN. 3GPP TSG RAN WG1 Meeting #99, Reno, USA, Nov. 18-22, 2019, R1-1912349, 6 pages.

Extended European Search Report issued in corresponding European Application No. 20915109.1, dated Dec. 13, 2022, pp. 1-8.

Chinese Office Action issued in corresponding Chinese Application No. 202080093940.3, dated Apr. 11, 2025, pp. 1-6.

* cited by examiner

DATA TRANSMISSION METHOD AND APPARATUS BASED ON A RECEIVED RRC SIGNALING INDICATING A HYBRID AUTOMATIC REPEAT REQUEST (HARQ) FUNCTION OF A HARQ PROCESS ASSOCIATED WITH A CONFIGURED GRANT IS ENABLED OR DISABLED

CROSS-REFERENCE TO RELATED APPLICATIONS

This application is a continuation of International Application No. PCT/CN2020/074037, filed on Jan. 23, 2020, the disclosure of which is hereby incorporated by reference in its entirety.

TECHNICAL FIELD

Embodiments of this application relate to the communication field, and in particular, to a data transmission method and an apparatus.

BACKGROUND

In the field of communication technologies, to ensure reliability of data transmission, a hybrid automatic repeat request (Hybrid Automatic Repeat reQuest, HARQ) manner is usually used for feedback and retransmission during data transmission.

In a current technology, for a same terminal device, a same HARQ operation is used for all services of the terminal device. For example, a data receiving status is fed back for all the services, or no data receiving status is fed back for all the services. However, one terminal device has a plurality of services having different transmission requirements. Although the HARQ technology can improve the reliability of data transmission, feedback and retransmission also cause a transmission delay. In the current technology, different data transmission processing cannot be performed based on requirements of different services, resulting in low flexibility of data transmission.

SUMMARY

Embodiments of this application provide a data transmission method and an apparatus, so that a terminal device can perform a same HARQ operation for a same service, to improve flexibility of data transmission.

According to a first aspect, a data transmission method is provided. The method is applicable to a communication apparatus, and the communication apparatus is, for example, a terminal device. The method includes: receiving first information, where the first information is used to indicate that a HARQ function of a hybrid automatic repeat request HARQ process associated with a first configured grant is enabled or disabled, and the first configured grant is configured by using radio resource control RRC signaling; and performing data transmission by using the first configured grant based on the first information.

In the method provided in this embodiment of this application, the first information may be used to ensure that HARQ function states of all HARQ processes associated with a same configured grant are consistent. For example, when the terminal device transmits data by using the configured grant, all HARQ functions of the HARQ processes are enabled, or when the terminal device transmits data by using the configured grant, all HARQ functions of the HARQ processes are disabled. It can be learned that in this embodiment of this application, it can be ensured that HARQ function states of HARQ processes used at a plurality of transmission opportunities of a same configured grant configured by using the RRC signaling are consistent, and the terminal device performs a same HARQ operation when performing a same service by using the same configured grant, to better match a service requirement of the terminal device and improve data transmission performance Each transmission opportunity of the configured grant corresponds to one HARQ process.

With reference to the first aspect, in a first possible implementation of the first aspect, the method further includes: receiving second information, where the second information is used to indicate that a HARQ function of a first HARQ process is enabled and/or that a HARQ function of a second HARQ process is disabled.

In the method provided in this embodiment of this application, an available HARQ process of the terminal device and a HARQ function state of the available HARQ process may be further configured by using the second information. When the first information indicates the HARQ function state of the first configured grant, the terminal device may select, from available processes, a HARQ process whose HARQ function state is consistent with that indicated by the first information, to ensure that a same HARQ operation is performed for data transmission performed by using the first configured grant, and all HARQ functions are enabled or disabled, to improve flexibility of data transmission.

With reference to the first possible implementation of the first aspect, in a second possible implementation of the first aspect, the second information is applicable only to a dynamically scheduled resource, and the method further includes: ignoring an indication of the second information when performing data transmission by using the first configured grant.

In the method provided in this embodiment of this application, the terminal device may determine a HARQ function state of the dynamically scheduled resource (or may be referred to as a dynamic grant) based on the second information, determine a HARQ function state of a configured grant (or may be referred to as a configured resource) based on only the first information, and ignore the indication of the second information. Therefore, it can be ensured that the first configured grant is mapped to the HARQ process whose HARQ function state is consistent with that indicated by the first information, the same HARQ operation is performed for data transmission performed by using the first configured grant, and all the HARQ functions are enabled or disabled, to improve the flexibility of data transmission.

With reference to the first possible implementation of the first aspect, in a third possible implementation of the first aspect, the performing data transmission by using the first configured grant based on the first information includes: performing data transmission by using the first configured grant based on the first information and the second information.

In the method provided in this embodiment of this application, both the first information and the first information are applicable to the configured grant, and the HARQ function state of the first configured grant may be determined based on the first information and the second information.

With reference to the third possible implementation of the first aspect, in a fourth possible implementation of the first aspect, a priority of the first information is higher than a priority of the second information.

In the method provided in this embodiment of this application, the priority of the first information is higher than the priority of the second information, and when both the first information and the first information are applicable to the configured grant, the HARQ function state of the first configured grant may be determined based on the first information.

With reference to the first aspect or the first to the fourth possible implementations of the first aspect, in a fifth possible implementation of the first aspect, the method further includes: determining a third HARQ process, where the third HARQ process is associated with the first configured grant, and a HARQ function state of the third HARQ process is consistent with the HARQ function state of the first configured grant.

In this embodiment of this application, after the HARQ function state of the first configured grant is determined, the first configured grant may be further mapped to a HARQ process whose HARQ function state is consistent with that of the first configured grant, to ensure that the same HARQ operation is performed for data transmission performed by using the first configured grant.

With reference to the fifth possible implementation of the first aspect, in a sixth possible implementation of the first aspect, the third HARQ process is an $i^{th}$ HARQ process in a first process set, where the first process set is a set of HARQ processes whose HARQ function states are consistent with that of the first configured grant, and i satisfies the following formula: i=[floor (T/P)] modulo M, where T is an identifier of a time unit in which the first configured grant is located, the time unit is a symbol, a slot, or a subframe, P is a periodicity of the configured grant, M is a quantity of processes in the first process set, floor is a floor operation, and modulo is a modulo operation.

This embodiment of this application provides a method for determining a HARQ process index. A HARQ process in the first process set may be determined based on the HARQ process index, so that the first configured grant is mapped to a HARQ process whose HARQ function state is consistent with that of the first configured grant.

With reference to the fifth possible implementation of the first aspect, in a seventh possible implementation of the first aspect, the third HARQ process is a $j^{th}$ HARQ process in a first process set, where the first process set is a set of HARQ processes whose HARQ function states are consistent with that of the first configured grant, and j satisfies the following formula: j=[floor (T/P)] modulo N, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, and modulo is a modulo operation.

This embodiment of this application provides another method for determining a HARQ process index. A HARQ process in the first process set may be determined based on the HARQ process index, so that the first configured grant is mapped to a HARQ process whose HARQ function state is consistent with that of the first configured grant.

With reference to the fifth possible implementation of the first aspect, in an eighth possible implementation of the first aspect, the third HARQ process is a $t^{th}$ HARQ process in a first process set, where the first process set is a set of HARQ processes whose HARQ function states are consistent with that of the first configured grant, and t satisfies the following formula: t={[floor (T/P)] modulo N} modulo M, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, modulo is a modulo operation, and M is a quantity of processes in the first process set.

This embodiment of this application provides another method for determining a HARQ process index. A HARQ process in the first process set may be determined based on the HARQ process index, so that the first configured grant is mapped to a HARQ process whose HARQ function state is consistent with that of the first configured grant.

According to a second aspect, a data transmission method is provided. The method is applicable to a communication apparatus, and the communication apparatus is, for example, a network device. The method includes: sending first information to a terminal device, where the first information is used to indicate that a HARQ function of a HARQ process associated with a first configured grant is enabled or disabled, and the first configured grant is configured by using radio resource control RRC signaling; and performing data transmission with the terminal device by using the first configured grant based on the first information.

In the method provided in this embodiment of this application, the first information may be used to ensure that HARQ function states of all HARQ processes associated with a same configured grant are consistent. For example, when the terminal device transmits data by using the configured grant, all HARQ functions of the HARQ processes are enabled, or when the terminal device transmits data by using the configured grant, all HARQ functions of the HARQ processes are disabled. It can be learned that in this embodiment of this application, it can be ensured that HARQ function states of HARQ processes used at a plurality of transmission opportunities of a same configured grant configured by using the RRC signaling are consistent, and the terminal device performs a same HARQ operation when performing a same service by using the same configured grant, to better match a service requirement of the terminal device and improve data transmission performance Each transmission opportunity of the configured grant corresponds to one HARQ process.

With reference to the second aspect, in a first possible implementation of the second aspect, the method further includes: sending second information to the terminal device, where the second information is used to indicate that a HARQ function of a first HARQ process is enabled and/or that a HARQ function of a second HARQ process is disabled.

With reference to the first possible implementation of the second aspect, in a second possible implementation of the second aspect, the second information is applicable only to a dynamically scheduled resource, and the method further includes: ignoring an indication of the second information when performing data transmission by using the first configured grant.

With reference to the first possible implementation of the second aspect, in a third possible implementation of the second aspect, the performing data transmission with the terminal device by using the first configured grant based on the first information includes: performing data transmission by using the first configured grant based on the first information and the second information.

With reference to the third possible implementation of the second aspect, in a fourth possible implementation of the second aspect, a priority of the first information is higher than a priority of the second information.

With reference to the second aspect or any one of the first to the fourth possible implementations of the second aspect, in a fifth possible implementation of the second aspect, the method further includes: determining a third HARQ process, where the third HARQ process is associated with the first configured grant, and a HARQ function state of the third HARQ process is consistent with the HARQ function state of the first configured grant.

With reference to the fifth possible implementation of the second aspect, in a sixth possible implementation of the second aspect, the third HARQ process is an $i^{th}$ HARQ process in a first process set, where the first process set is a set of HARQ processes whose HARQ function states are consistent with that of the first configured grant, and i satisfies the following formula: i=[floor (T/P)] modulo M, where T is an identifier of a time unit in which the first configured grant is located, the time unit is a symbol, a slot, or a subframe, P is a periodicity of the configured grant, M is a quantity of processes in the first process set, floor is a floor operation, and modulo is a modulo operation.

With reference to the fifth possible implementation of the second aspect, in a seventh possible implementation of the second aspect, the third HARQ process is a $j^{th}$ HARQ process in a first process set, where the first process set is a set of HARQ processes whose HARQ function states are consistent with that of the first configured grant, and j satisfies the following formula: j=[floor (T/P)] modulo N, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, and modulo is a modulo operation.

With reference to the fifth possible implementation of the second aspect, in an eighth possible implementation of the second aspect, the third HARQ process is a $t^{th}$ HARQ process in a first process set, where the first process set is a set of HARQ processes whose HARQ function states are consistent with that of the first configured grant, and t satisfies the following formula: t={[floor (T/P)] modulo N} modulo M, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, modulo is a modulo operation, and M is a quantity of processes in the first process set.

According to a third aspect, a communication apparatus is provided. The communication apparatus is, for example, a terminal device. The communication apparatus includes: a communication unit, configured to receive first information, where the first information is used to indicate that a HARQ function of a hybrid automatic repeat request HARQ process associated with a first configured grant is enabled or disabled, and the first configured grant is configured by using radio resource control RRC signaling; and a processing unit, configured to perform data transmission by using the first configured grant based on the first information.

With reference to the third aspect, in a first possible implementation of the third aspect, the communication unit is further configured to receive second information, where the second information is used to indicate that a HARQ function of a first HARQ process is enabled and/or that a HARQ function of a second HARQ process is disabled.

With reference to the first possible implementation of the third aspect, in a second possible implementation of the third aspect, the second information is applicable only to a dynamically scheduled resource, and the processing unit is further configured to ignore an indication of the second information when performing data transmission by using the first configured grant.

With reference to the first possible implementation of the third aspect, in a third possible implementation of the third aspect, the processing unit is specifically configured to perform data transmission by using the first configured grant based on the first information and the second information.

With reference to the third possible implementation of the third aspect, in a fourth possible implementation of the third aspect, a priority of the first information is higher than a priority of the second information.

With reference to the third aspect or any one of the first to the fourth possible implementations of the third aspect, in a fifth possible implementation of the third aspect, the processing unit is further configured to determine a third HARQ process, where the third HARQ process is associated with the first configured grant, and a HARQ function state of the third HARQ process is consistent with a HARQ function state of the first configured grant.

With reference to the fifth possible implementation of the third aspect, in a sixth possible implementation of the third aspect, the third HARQ process is an $i^{th}$ HARQ process in a first process set, where the first process set is a set of HARQ processes whose HARQ function states are consistent with that of the first configured grant, and i satisfies the following formula: i=[floor (T/P)] modulo M, where T is an identifier of a time unit in which the first configured grant is located, the time unit is a symbol, a slot, or a subframe, P is a periodicity of the configured grant, M is a quantity of processes in the first process set, floor is a floor operation, and modulo is a modulo operation.

With reference to the fifth possible implementation of the third aspect, in a seventh possible implementation of the third aspect, the third HARQ process is a $j^{th}$ HARQ process in a first process set, where the first process set is a set of HARQ processes whose HARQ function states are consistent with that of the first configured grant, and j satisfies the following formula: j=[floor (T/P)] modulo N, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, and modulo is a modulo operation.

With reference to the fifth possible implementation of the third aspect, in an eighth possible implementation of the third aspect, the third HARQ process is a $t^{th}$ HARQ process in a first process set, where the first process set is a set of HARQ processes whose HARQ function states are consistent with that of the first configured grant, and t satisfies the following formula: t={[floor (T/P)] modulo N} modulo M, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, modulo is a modulo operation, and M is a quantity of processes in the first process set.

According to a fourth aspect, a communication apparatus is provided. The communication apparatus is, for example, a network device. The communication apparatus includes: a communication unit, configured to send first information to a terminal device, where the first information is used to indicate that a HARQ function of a HARQ process associated with a first configured grant is enabled or disabled, and the first configured grant is configured by using radio resource control RRC signaling; and a processing unit, configured to perform data transmission with the terminal device by using the first configured grant based on the first information.

With reference to the fourth aspect, in a first possible implementation of the fourth aspect, the communication unit is further configured to send second information to the terminal device, where the second information is used to indicate that a HARQ function of a first HARQ process is enabled and/or that a HARQ function of a second HARQ process is disabled.

With reference to the first possible implementation of the fourth aspect, in a second possible implementation of the fourth aspect, the second information is applicable only to a dynamically scheduled resource, and the processing unit is further configured to ignore an indication of the second information when performing data transmission by using the first configured grant.

With reference to the first possible implementation of the fourth aspect, in a third possible implementation of the fourth aspect, the processing unit is further configured to perform data transmission by using the first configured grant based on the first information and the second information.

With reference to the first possible implementation of the fourth aspect, in a fourth possible implementation of the fourth aspect, a priority of the first information is higher than a priority of the second information.

With reference to the fourth aspect or any one of the first to the fourth possible implementations of the fourth aspect, in a fifth possible implementation of the fourth aspect, the processing unit is further configured to determine a third HARQ process, where the third HARQ process is associated with the first configured grant, and a HARQ function state of the third HARQ process is consistent with the HARQ function state of the first configured grant.

With reference to the fifth possible implementation of the fourth aspect, in a sixth possible implementation of the fourth aspect, the third HARQ process is an $i^{th}$ HARQ process in a first process set, where the first process set is a set of HARQ processes whose HARQ function states are consistent with that of the first configured grant, and i satisfies the following formula: i=[floor (T/P)] modulo M, where T is an identifier of a time unit in which the first configured grant is located, the time unit is a symbol, a slot, or a subframe, P is a periodicity of the configured grant, M is a quantity of processes in the first process set, floor is a floor operation, and modulo is a modulo operation.

With reference to the fifth possible implementation of the fourth aspect, in a seventh possible implementation of the fourth aspect, the third HARQ process is a $j^{th}$ HARQ process in a first process set, where the first process set is a set of HARQ processes whose HARQ function states are consistent with that of the first configured grant, and j satisfies the following formula: j=[floor (T/P)] modulo N, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, and modulo is a modulo operation.

With reference to the fifth possible implementation of the fourth aspect, in an eighth possible implementation of the fourth aspect, the third HARQ process is a $t^{th}$ HARQ process in a first process set, where the first process set is a set of HARQ processes whose HARQ function states are consistent with that of the first configured grant, and t satisfies the following formula: t={[floor (T/P)] modulo N} modulo M, where T is an identifier of a time unit in which the first configured grant is located, the time unit is a symbol, a slot, or a subframe, P is a periodicity of the configured grant, N is a total quantity of HARQ processes configured by using the RRC signaling, floor is a floor operation, modulo is a modulo operation, and M is a quantity of processes in the first process set.

It should be noted that when the communication apparatus is a network device, a terminal device, or a combined component that can implement functions of the network device and the terminal device, the communication unit may be a transceiver, and may include an antenna, a radio frequency circuit, and the like, where the transceiver may be a transmitter and a receiver that are integrated; and the processing module may be a processor, for example, a baseband chip. When the communication apparatus is a component having functions of the network device and the terminal device, the communication unit may be a radio frequency unit, and the processing module may be a processor. When the communication apparatus is a chip system, the communication unit may be an input/output interface of the chip system, and the processing module may be a processor, for example, a central processing unit (central processing unit, CPU), of the chip system.

According to a fifth aspect, a communication apparatus is provided, including at least one processor and a communication interface. The processor is configured to perform the method according to any one of the second aspect or the implementations of the second aspect or the method according to any one of the first aspect or the implementations of the first aspect.

The communication interface is used for communication between the communication apparatus and another device.

Optionally, the communication apparatus may further include a memory. The at least one processor may be coupled to the memory, and the memory is configured to store a computer program.

The at least one processor is configured to execute the computer program stored in the memory, so that the apparatus performs the method according to any one of the second aspect or the implementations of the second aspect or the method according to any one of the first aspect or the implementations of the first aspect.

According to a sixth aspect, a computer-readable storage medium is provided. The computer-readable storage medium stores instructions. When the computer-readable storage medium runs on the communication apparatus according to any one of the fourth aspect or the implementations of the fourth aspect, the communication apparatus is enabled to perform the communication method according to any one of the second aspect or the implementations of the second aspect.

According to a seventh aspect, a computer-readable storage medium is provided. The computer-readable storage medium stores instructions. When the computer-readable storage medium runs on the communication apparatus according to any one of the third aspect or the implementations of the third aspect, the communication apparatus is enabled to perform the communication method according to any one of the first aspect or the implementations of the first aspect.

According to an eighth aspect, a wireless communication apparatus is provided. The communication apparatus includes a processor for example, used in the communication apparatus, to implement the method according to any one of the first aspect or the implementations of the first aspect. The communication apparatus may be, for example, a chip system. In a feasible implementation, the chip system further includes a memory. The memory is configured to store program instructions and data that are necessary for implementing the function in the method in the first aspect.

According to a ninth aspect, a wireless communication apparatus is provided. The communication apparatus includes a processor for example, used in the communication apparatus, to implement the method according to any one of the second aspect or the implementations of the second aspect or the functions in the method. The communication apparatus may be, for example, a chip system. In a feasible implementation, the chip system further includes a memory. The memory is configured to store program instructions and data that are necessary for implementing the function in the method in the second aspect.

The chip system in the foregoing aspects may be a system on chip (system on chip, SOC), or may be a baseband chip or the like. The baseband chip may include a processor, a channel encoder, a digital signal processor, a modem, an interface module, and the like.

According to a tenth aspect, a communication system is provided, including a network device and a terminal device.

The network device sends first information to the terminal device, where the first information is used to indicate that a HARQ function of a hybrid automatic repeat request HARQ process associated with a first configured grant is enabled or disabled, and the first configured grant is configured by using radio resource control RRC signaling.

The terminal device receives the first information, and performs data transmission by using the first configured grant based on the first information.

For a specific execution process of the terminal device, refer to any one of the first aspect or the possible implementations of the first aspect. Details are not described herein again. For a specific execution process of the network device, refer to any one of the second aspect or the possible implementations of the second aspect. Details are not described herein again.

According to an eleventh aspect, a chip is provided. The chip includes a processor and a communication interface. The processor is configured to perform the method according to any one of the second aspect or the implementations of the second aspect or the method according to any one of the first aspect or the implementations of the first aspect. The communication interface is used for communication between the communication apparatus and another device.

DESCRIPTION OF EMBODIMENTS

Figure 1:
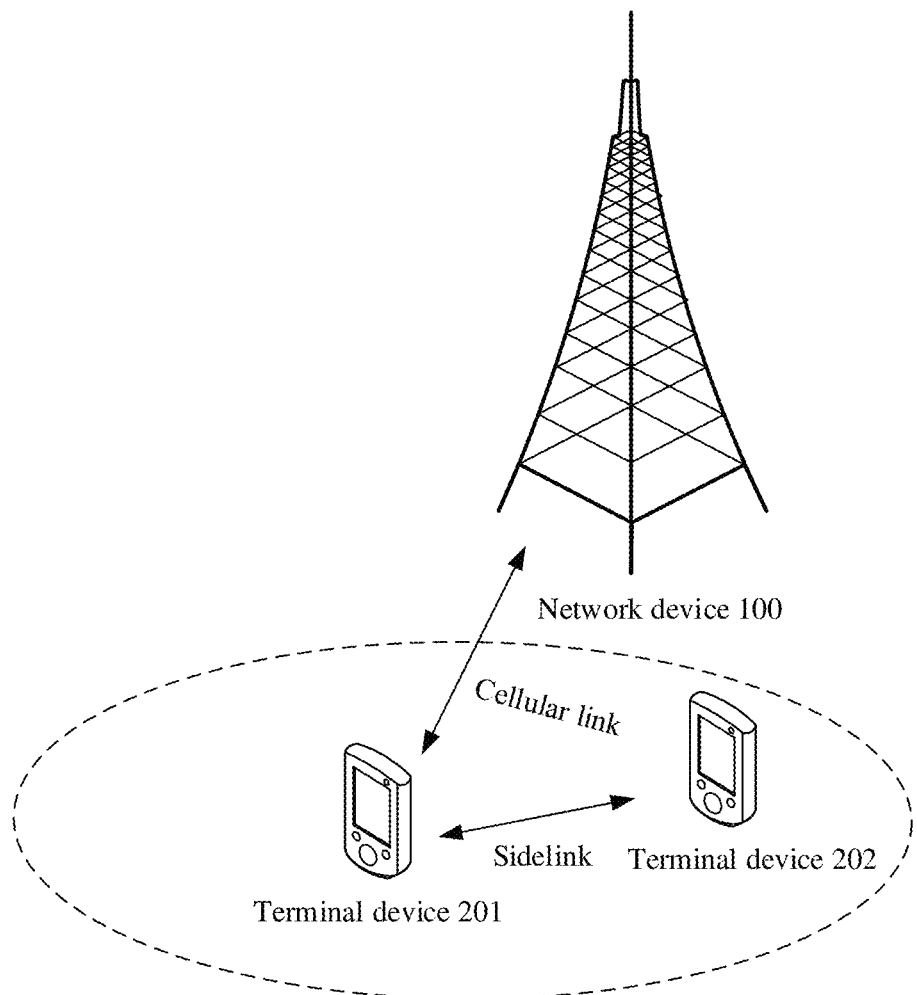
FIG. 1 is a schematic diagram of a communication system according to an embodiment of this application.

A method provided in embodiments of this application is applicable to a communication system shown in FIG. 1. Refer to FIG. 1. The communication system may include a plurality of terminal devices and a network device.

FIG. 1 is a schematic diagram of a communication system to which technical solutions provided in this application are applicable. The communication system may include a plurality of network devices (only a network device 100 is shown) and a plurality of terminal devices (only a terminal device 201 and a terminal device 202 are shown in the figure). FIG. 1 is merely a schematic diagram, and does not constitute any limitation on a scenario to which the technical solutions provided in this application are applicable. The communication system supports sidelink communication, for example, device to device (device to device, D2D) communication and vehicle to everything (vehicle to everything, V2X) communication.

The network device and the terminal device may perform uplink and downlink transmission through a cellular link (a Uu link), and the terminal devices may communicate with each other through a sidelink (sidelink), where the communication is, for example, D2D communication, V2X communication, and machine type communication (machine type communication, MTC).

The network device and the terminal device may perform uplink and downlink transmission through a cellular link (a Uu link), and the terminal devices may communicate with each other through a sidelink (sidelink), where the communication is, for example, D2D communication, V2X communication, and machine type communication (machine type communication, MTC).

In a possible implementation, the network device 100 is carried on a high-altitude aircraft (for example, a satellite), the high-altitude aircraft periodically runs around the earth, and the terminal device (the terminal device 201 is used as an example) is located on the ground. Because signal coverage provided by the network device 100 is large and a running orbit periodicity of the network device 100 is short, for the terminal device 201, when the signal coverage provided by the network device 100 periodically appears in a same geographical area, the terminal device 201 generally does not move out of the geographical area. Refer to FIG. 1. When the network device 100 runs to a place on an orbit of the network device 100, the terminal device 201 may obtain system information of the network device 100, and perform communication within the signal coverage of the network device 100. When the network device 100 continues to run, the terminal device 201 leaves the signal coverage of the network device 100, and the network device 100 no longer provides the signal coverage for the terminal device 201.

In a scenario in which the network device is carried on the satellite, satellites can be classified, based on satellite orbit heights, into a low earth orbit (low earth orbit, LEO) satellite, a medium earth orbit (medium earth orbit, MEO) satellite, a geostationary earth orbit (geostationary earth orbit, GEO) satellite, and a highly elliptical orbit (highly earth orbit, HEO) satellite.

In a possible implementation, the network device 100 (for example, a base station) is on the ground, and the terminal device communicates with a core network device by using the network device on the ground.

The network device 100 may be any device with a wireless transceiver function. The network device includes but is not limited to: an evolved NodeB (E-UTRAN NodeB, e-NodeB, or eNB) in LTE, a base station (gNodeB or gNB) or a transmission reception point (transmission/reception point, TRP) in 5G or a new radio (new radio, NR) access technology, a subsequently evolved base station in 3GPP, an access node in a Wi-Fi system, a wireless relay node, a wireless backhaul node, and the like. The base station may be a macro base station, a micro base station, a pico base station, or a small cell, or may be a radio controller, a centralized unit (centralized unit, CU), and/or a distributed unit (distributed unit, DU) in a Cloud RAN scenario or an Open RAN scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with the terminal device through a relay station. The terminal device may communicate with a plurality of base stations using different technologies. For example, the terminal device may communicate with a base station supporting an LTE network, may communicate with a base station supporting a 5G network, and may further support dual connectivity to a base station in an LTE network and a base station in a 5G network.

The terminal device (for example, the terminal device 201) is a device having a wireless transceiver function, and may be deployed on land, including an indoor device or an outdoor device, a handheld device, a wearable device, or a vehicle-mounted device, may be deployed on water (for example, on a ship), or may be deployed in the air (for example, on an airplane, a balloon, or a satellite). The terminal device may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self-driving (self-driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a wearable terminal device, or the like. An application scenario is not limited in embodiments of this application. The terminal sometimes may also be referred to as a terminal device, user equipment (user equipment, UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may be fixed or mobile. The terminal device in this application may alternatively be a vehicle-mounted module, a vehicle-mounted module assembly, a vehicle-mounted component, a vehicle-mounted chip, or a vehicle-mounted unit with which a vehicle is equipped as one or more components or units. The vehicle may use the built-in vehicle-mounted module, the vehicle-mounted module assembly, the vehicle-mounted component, the vehicle-mounted chip, or the vehicle-mounted unit to implement the method in this application.

First, terms used in embodiments of this application are explained and described.

(1) Configured Grant (Configured Grant)

Figure 2:
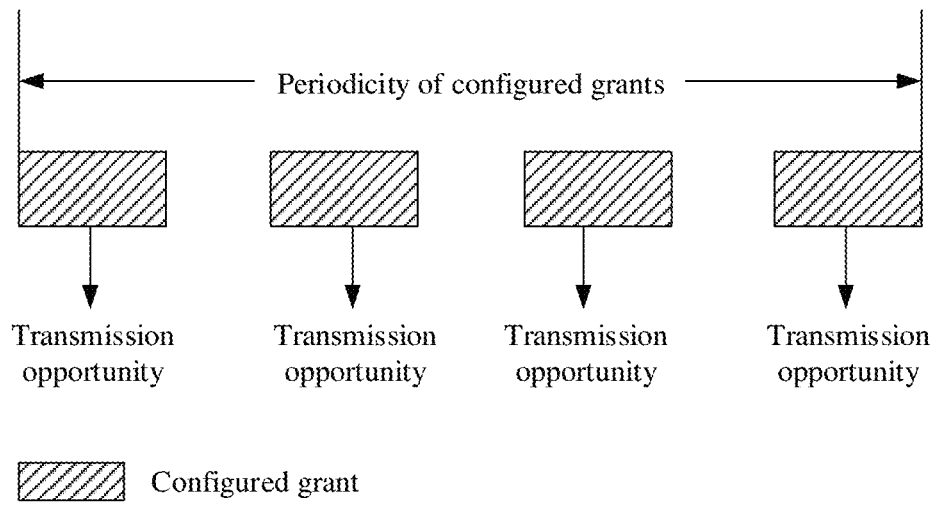
FIG. 2 is a schematic diagram of a configured grant according to an embodiment of this application.

Refer to FIG. 2. In a configured scheduling manner (for example, a semi-persistent scheduling manner), the base station may configure, by using radio resource control (radio resource control, RRC) signaling, a resource (a transmission opportunity) that periodically appears. The resource that periodically appears may be referred to as a configured grant. It may be understood that the configured grant includes a plurality of transmission opportunities. For example, a configured grant shown in FIG. 2 includes four transmission opportunities that periodically appear.

In embodiments of this application, the configured grant may also be referred to as configured scheduling or a configured resource. The configured grant may include a first-type configured resource (type1) and a second-type configured resource (type2). The configured resource may also be referred to as grant free (grant free), and the configured resource type 2 may also be referred to as SPS (semi-persistent scheduling, semi-persistent scheduling). For an SPS resource, the base station may further activate the configured grant by using downlink control information (downlink control information, DCI), and then the terminal device may perform data transmission by using the configured grant. When performing data transmission by using the first-type configured resource, the terminal device does not need to use the DCI for activation.

It may be understood that when data transmission is performed by using the configured resource, that is, data is transmitted on the configured grant, if a HARQ function is configured during data transmission, a HARQ process needs to be performed based on a HARQ function state.

(2) Dynamic Grant (Dynamic Grant)

In a dynamic scheduling manner, the base station sends DCI to the terminal device by using a downlink control channel (physical downlink control channel, PDCCH). The DCI may dynamically indicate a resource and HARQ information that are configured by the base station. The HARQ information may include a HARQ process number, a redundancy version, and the like. Such a resource dynamically scheduled by using the DCI may be referred to as a dynamic grant, and the dynamic grant may also be referred to as a dynamically scheduled resource.

(3) HARQ Process (Process)

One HARQ entity may include a plurality of HARQ processes. In a data transmission process, the terminal device and the network device may transmit different data in parallel by using the plurality of HARQ processes. Different data transmissions are associated with different HARQ processes. The terminal device and the network device may identify corresponding data transmission by using a process identifier. In embodiments of this application, performing data transmission by using the HARQ process may be understood as associating the HARQ process with one data transmission. For example, if a process 1 is used to transmit a data packet 1 on a transmission resource (for example, a configured grant or a dynamic grant), it may be understood that current transmission of the data packet 1 is associated with the process 1. When the terminal device and the network device perform processing, the data packet 1 is placed in a HARQ buffer corresponding to the process 1 for processing. If there is subsequent retransmission of the data packet 1, the same HARQ process is also used, to ensure that the terminal device and the network device can identify that the transmission is the retransmission of the data packet 1. Then, HARQ combination is performed.

For example, for downlink data transmission, the network device may send data by using a HARQ process, receive HARQ feedback information of a corresponding process from the terminal device, and retransmit the data to the terminal device based on the feedback information. For uplink data transmission, the terminal device may send data to the network device by using a HARQ process, and receive HARQ feedback information that corresponds to the HARQ process and that is sent by the network device.

The HARQ feedback information is used to indicate a receiving status of data corresponding to a HARQ process. Assuming that the data is successfully received, the HARQ feedback information corresponding to the HARQ process is an acknowledgment (acknowledgment, ACK). Assuming that the data is not successfully received, the HARQ feedback information corresponding to the HARQ process is a negative acknowledgment (negative acknowledgment, NACK).

It should be noted that a radio access control (media access control, MAC) entity of the terminal device maintains a plurality of HARQ entities for the terminal device, and one HARQ entity may maintain a plurality of parallel HARQ processes.

When data is transmitted by using a HARQ process, if a receive end successfully decodes a data packet after receiving the data packet from a transmit end, the receive end sends an ACK to the transmit end. After receiving the ACK, the transmit end sends a next data packet.

If the data packet is not successfully decoded, the receive end may discard the data packet, and send a NACK to the transmit end. After receiving the NACK, the transmit end retransmits a data packet. In a possible implementation, the terminal device may further improve decoding performance by using a soft combining (HARQ with soft combining) technology. For example, a data packet that is not successfully decoded is stored in a HARQ buffer corresponding to a process, and is combined with a retransmitted data packet that is subsequently received, and the combined data packet is decoded. Compared with decoding only one data packet, this can improve reliability.

(4) HARQ Process Number

A HARQ process number is a HARQ ID used to identify a HARQ process. Each HARQ entity of the terminal device maintains a specific quantity of HARQ processes, and different HARQ processes may be distinguished by using HARQ IDs.

(5) HARQ Function State

HARQ function states may include an on state or an off state, or in other words, include an enabled (enabled) state or a disabled (disabled) state.

It is assumed that when a HARQ function corresponding to a process is enabled, a transmit end and a receive end need to maintain a HARQ buffer corresponding to the process to store a corresponding data packet. The receive end needs to send a HARQ feedback based on a receiving status of the data packet, and the transmit end may perform retransmission or new transmission based on the HARQ feedback. The HARQ feedback includes an ACK or a NACK.

It is assumed that when a HARQ function corresponding to a process is disabled, a transmit end and a receive end may not maintain a HARQ buffer for the process. After sending a data packet, the transmit end does not need to buffer the data packet. When receiving the data packet, regardless of whether the data packet is successfully received or fails to be received, the receive end does not need to send a HARQ feedback to the transmit end. If the data packet fails to be received, the receive end may choose to discard the data packet, and does not need to place the data packet in the buffer to wait for HARQ combination.

In configured scheduling in a current technology, when the terminal device may perform data transmission by using a plurality of configured grants (configured grants) that periodically appear, for one transmission opportunity of one configured grant, the terminal device may calculate one HARQ process number based on a time domain symbol in which the transmission opportunity appears, and perform data transmission by using the configured grant and by using a HARQ process identified by the process number. For example, the HARQ process number satisfies the following formula:

$$\text{HARQ process number} = [\text{floor}(T/P)] \text{ modulo } M \quad (1)$$

T represents an identifier CURRENT_symbol of the symbol in which the transmission opportunity occurs, P represents a periodicity of a configured resource, and M represents a maximum quantity of HARQ processes in one HARQ entity configured for the terminal device. The HARQ entity is a HARQ entity corresponding to a serving cell on which the terminal device camps, and a HARQ process maintained by the HARQ entity may be configured by a network device by using RRC signaling. In formula (1), floor is a floor operation, and modulo is a modulo operation.

Usually, the configured grant is configured for services with same quality of service (quality of service, QoS) or configured for a same service. When the same service of the terminal device uses the configured resource at some transmission opportunities, it is obtained, through calculation, that a HARQ function of a HARQ process is enabled; while when the same service of the terminal device uses a configured resource at other transmission opportunities, it is obtained, through calculation, that a HARQ function of a HARQ process is disabled. Consequently, HARQ functions of the same service are different, and data transmission performance is affected. For example, for a delay-sensitive service, the HARQ function needs to be disabled, and HARQ feedback information is not sent, so that a data transmission delay can be reduced. However, according to the process described above, assuming that a configured grant is configured for the service, when the terminal device uses the configured resource on some transmission opportunities, the configured resource may be mapped to a HARQ process whose HARQ function is enabled. Consequently, the transmission delay is increased, and a service requirement cannot be met.

Figure 3:
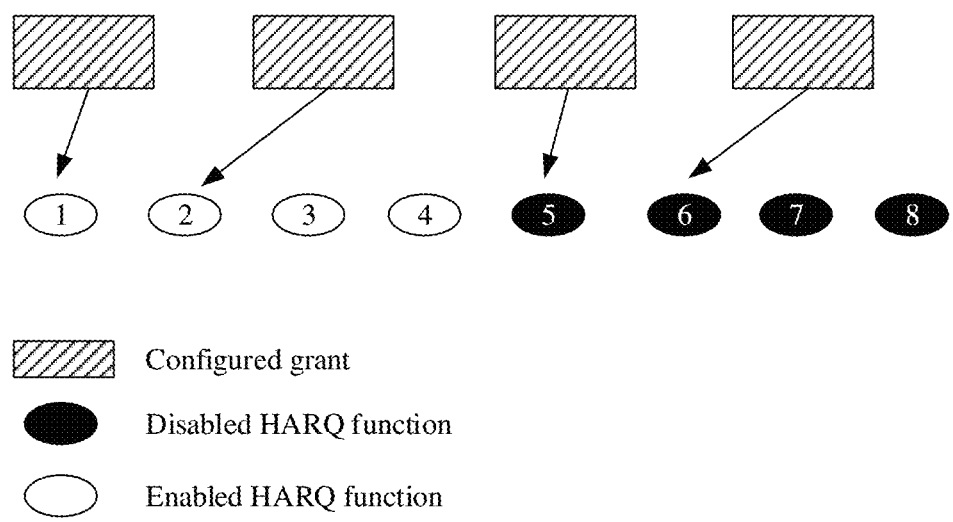
FIG. 3 is a schematic diagram of an existing HARQ mapping method.

For example, refer to FIG. 3. One HARQ entity of the terminal device maintains HARQ processes 1 to 8. HARQ functions of HARQ processes 1 to 4 are enabled, and HARQ functions of HARQ processes 5 to 8 are disabled. It is assumed that process numbers used at four transmission opportunities of the configured grants in FIG. 2 that are obtained through calculation according to the foregoing formula (1) are respectively 1, 2, 5, and 6. HARQ functions of HARQ processes 1 and 2 are enabled, and HARQ functions of HARQ processes 5 and 6 are disabled. It is assumed that for a delay-sensitive service of the terminal device, if the terminal device feeds back an ACK or a NACK when the HARQ function is enabled, the transmission delay is increased, and the service requirement cannot be met.

An embodiment of this application provides a data transmission method. A terminal device receives first information, where the first information is used to indicate that a HARQ function of a HARQ process associated with a first configured resource is enabled or disabled, and the first configured resource is configured by using radio resource control RRC signaling. The terminal device may further perform data transmission by using the first configured resource based on the first information. For example, the terminal device may determine, based on the first information, whether the HARQ function is enabled when performing data transmission by using the first configured resource. In the method provided in this embodiment of this application, the first information may be used to ensure that HARQ function states of all HARQ processes associated with a same configured grant are consistent. For example, when the terminal device transmits data by using the configured grant, all HARQ functions of the HARQ processes are enabled, or when the terminal device transmits data by using the configured grant, all HARQ functions of the HARQ processes are disabled. It can be learned that in this embodiment of this application, it can be ensured that HARQ function states of HARQ processes used at a plurality of transmission opportunities of a same configured grant configured by using the RRC signaling are consistent, and the terminal device performs a same HARQ operation when performing a same service by using the same configured grant, to better match a service requirement of the terminal device and improve data transmission performance. Each transmission opportunity of the configured grant corresponds to one HARQ process.

Figure 4A:
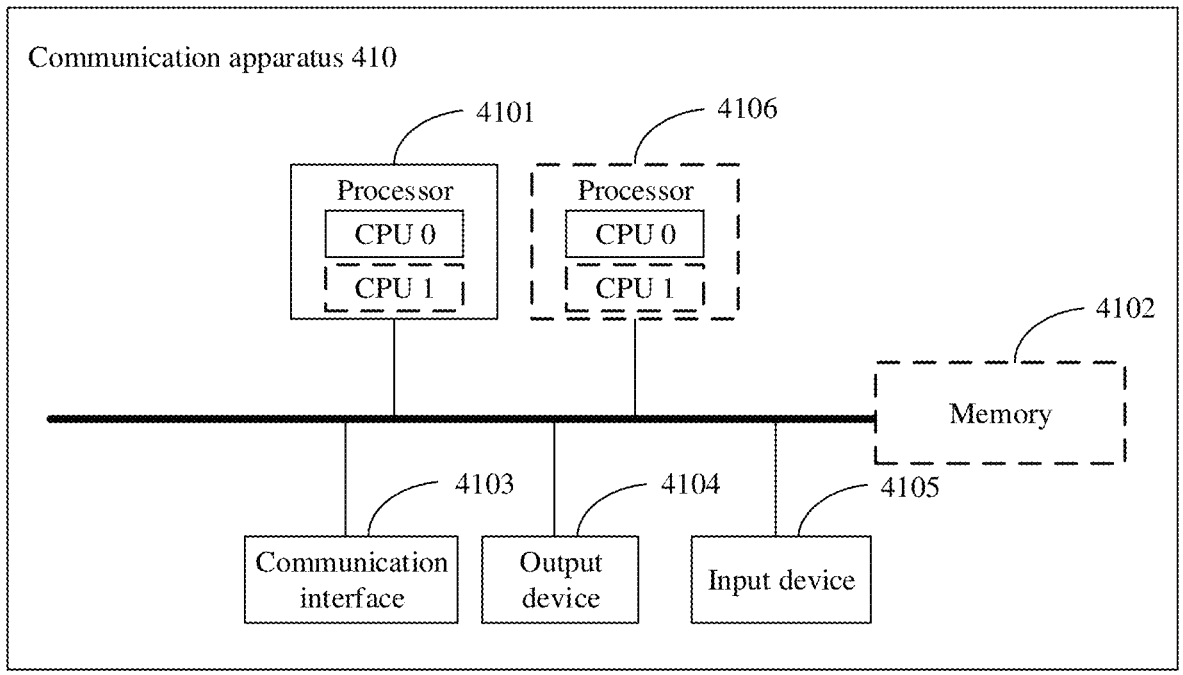
FIG. 4a is a block diagram of a structure of a communication apparatus according to an embodiment of this application.

The terminal device in this embodiment of this application may be implemented by using a communication apparatus 410 in FIG. 4a. FIG. 4a is a schematic diagram of a hardware structure of the communication apparatus 410 according to an embodiment of this application. The communication apparatus 410 includes a processor 4101, a memory 4102, and at least one communication interface (where in FIG. 4a, an example in which a communication interface 4103 is included is merely used for description). The processor 4101, the memory 4102, and the communication interface 4103 are connected to each other. Optionally, the communication apparatus 410 may not include the memory 4102.

The processor 4101 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication interface 4103 is configured to communicate with another device or a communication network such as the Ethernet, a radio access network (radio access network, RAN), or a wireless local area network (wireless local area network, WLAN) by using any transceiver-type apparatus.

The memory 4102 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, or may be connected to the processor. Alternatively, the memory may be integrated with the processor.

The memory 4102 is configured to store computer-executable instructions for executing the solutions in this application, and the execution is controlled by the processor 4101. The processor 4101 is configured to execute the computer-executable instructions stored in the memory 4102, to implement the intent processing methods provided in the following embodiments of this application.

Optionally, the computer-executable instructions in embodiments of this application may also be referred to as application program code. This is not specifically limited in embodiments of this application.

During specific implementation, in an embodiment, the processor 4101 may include one or more CPUs, for example, a CPU 0 and a CPU 1 in FIG. 4a.

During specific implementation, in an embodiment, the communication apparatus 410 may include a plurality of processors, for example, the processor 4101 and a processor 4106 in FIG. 4a. Each of the processors may be a single-core processor (single-CPU) or a multi-core processor (multi-CPU). Herein, the processor may be one or more devices, circuits, and/or processing cores configured to process data (for example, computer program instructions).

During specific implementation, in an embodiment, the communication apparatus 410 may further include an output device 4104 and an input device 4105. The output device 4104 communicates with the processor 4101, and may display information in a plurality of manners. For example, the output device 4104 may be a liquid crystal display (liquid crystal display, LCD), a light emitting diode (light emitting diode, LED) display device, a cathode ray tube (cathode ray tube, CRT) display device, a projector (projector), or the like. The input device 4105 communicates with the processor 4101, and may receive an input from a user in a plurality of manners. For example, the input device 4105 may be a mouse, a keyboard, a touchscreen device, a sensor device, or the like.

The communication apparatus 410 may be a general-purpose device or a special-purpose device. During specific implementation, the communication apparatus 410 may be a desktop computer, a portable computer, a network server, a personal digital assistant (personal digital assistant, PDA), a mobile phone, a tablet computer, a wireless terminal apparatus, an embedded device, or a device having a structure similar to that in FIG. 4a. A type of the communication apparatus 410 is not limited in this embodiment of this application.

It should be noted that the communication apparatus 410 may be an entire terminal, may be a part or component that implements a function of the terminal, or may be a communication chip, for example, a baseband chip. When the communication apparatus 410 is an entire terminal, the communication interface may be a radio frequency module. When the communication apparatus 410 is a communication chip, the communication interface 4103 may be an input/output interface circuit of the chip, where the input/output interface circuit is configured to read and output a baseband signal.

Figure 4B:
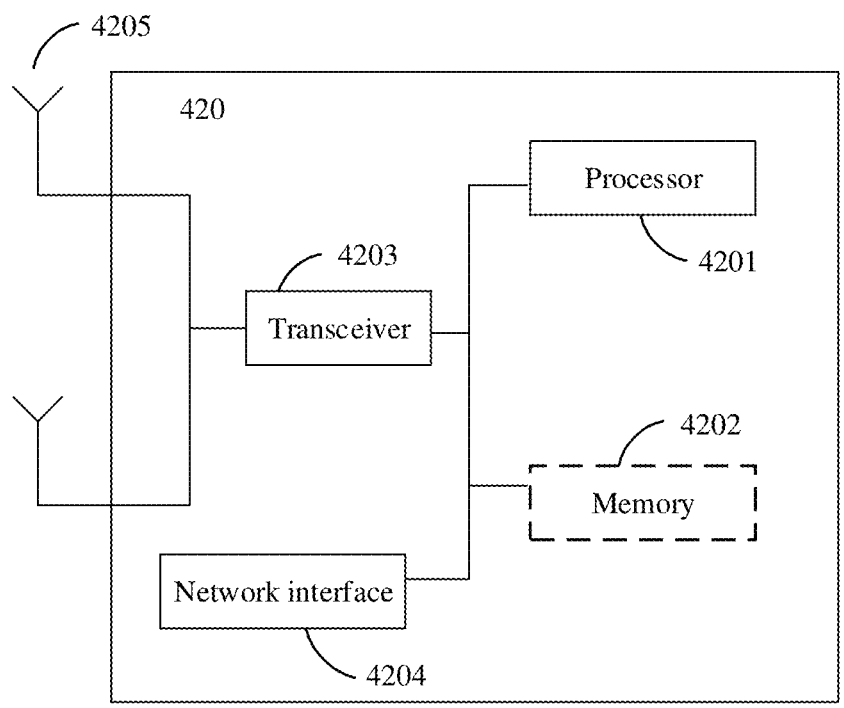
FIG. 4b is another block diagram of a structure of a communication apparatus according to an embodiment of this application.

FIG. 4b is a schematic diagram of a structure of a network device. For a structure of a network device 420, refer to the structure shown in FIG. 4b.

The network device includes at least one processor 4201, at least one memory 4202, at least one transceiver 4203, at least one network interface 4204, and one or more antennas 4205. The processor 4201, the memory 4202, the transceiver 4203, and the network interface 4204 are connected, for example, through a bus. The antenna 4205 is connected to the transceiver 4203. The network interface 4204 is configured to connect the network device to another communication device by using a communication link. For example, the network device is connected to a core network element by using an S1 interface. In this embodiment of this application, the connection may include various types of interfaces, transmission lines, buses, or the like. This is not limited in this embodiment. Optionally, the network device 420 may not include the memory 4202.

A processor, for example, the processor 4201, in this embodiment of this application may include at least one of the following types: a general-purpose central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 4201 may be a single-core processor (single-CPU) or a multi-core processor (multi-CPU). The at least one processor 4201 may be integrated into one chip or located on a plurality of different chips.

A memory, for example, the memory 4202, in this embodiment of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The memory 4202 may exist independently, and is connected to the processor 4201. Optionally, the memory 4202 may alternatively be integrated with the processor 4201, for example, integrated into one chip. The memory 4202 can store program code for executing the technical solutions in this embodiment of this application, and the processor 4201 controls the execution. Various types of executed computer program code may also be considered as drivers of the processor 4201. For example, the processor 4201 is configured to execute the computer program code stored in the memory 4202, to implement the technical solutions in this embodiment of this application.

The transceiver 4203 may be configured to support receiving or sending of a radio frequency signal between the network device and a terminal device, and the transceiver 4203 may be connected to the antenna 4205. Specifically, the one or more antennas 4205 may receive a radio frequency signal. The transceiver 4203 may be configured to: receive the radio frequency signal from the antenna, convert the radio frequency signal into a digital baseband signal or a digital intermediate frequency signal, and provide the digital baseband signal or the digital intermediate frequency signal for the processor 4201, so that the processor 4201 further processes the digital baseband signal or the digital intermediate frequency signal, for example, performs demodulation processing and decoding processing. In addition, the transceiver 4203 may be configured to: receive a modulated digital baseband signal or digital intermediate frequency signal from the processor 4201, convert the modulated digital baseband signal or digital intermediate frequency signal into a radio frequency signal, and send the radio frequency signal through the one or more antennas 4205. Specifically, the transceiver 4203 may selectively perform one or more levels of frequency down-mixing processing and analog-to-digital conversion processing on the radio frequency signal to obtain the digital baseband signal or the digital intermediate frequency signal.

A sequence of the frequency down-mixing processing and the analog-to-digital conversion processing is adjustable. The transceiver 4203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals. The transceiver may be referred to as a transceiver circuit, a transceiver unit, a transceiver component, a sending circuit, a sending unit, a sending component, or the like.

It should be noted that the communication apparatus 420 may be an entire network device, may be a part or component that implements a function of the network device, or may be a communication chip. When the communication apparatus 420 is a communication chip, the transceiver 4203 may be an interface circuit of the chip, where the interface circuit is configured to read and output a baseband signal.

Figure 5:
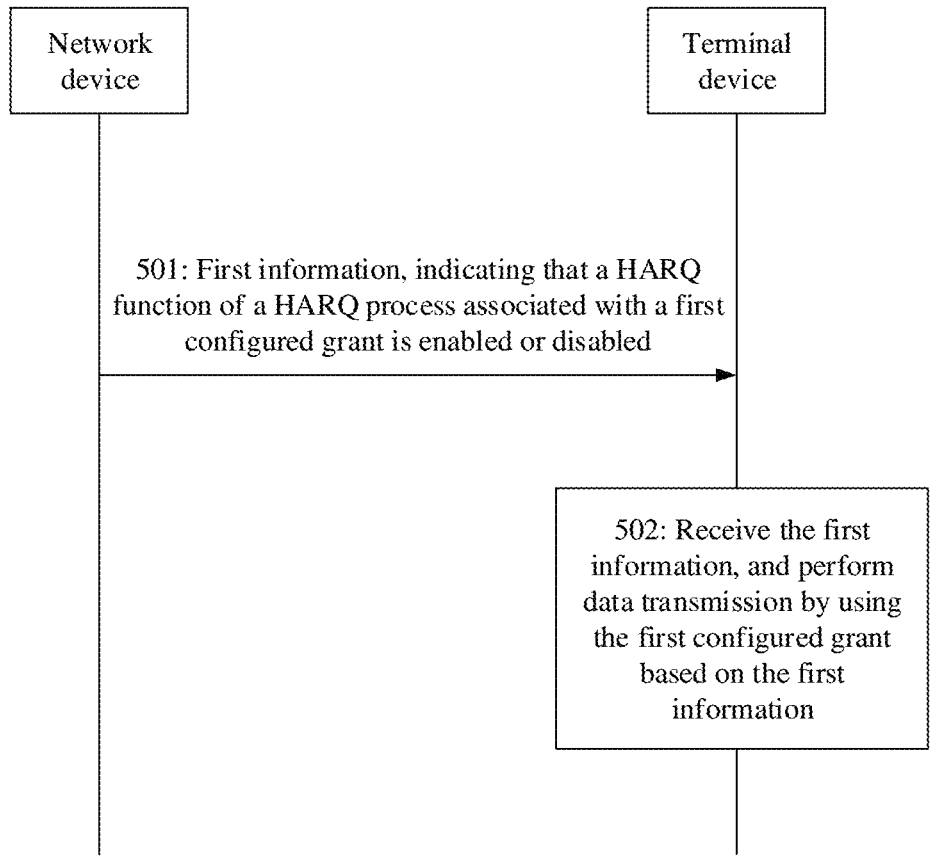
FIG. 5 is a schematic flowchart of a data transmission method according to an embodiment of this application.

An embodiment of this application provides a HARQ indication method. As shown in FIG. 5, the method includes the following steps.

501: A network device sends first information to a terminal device. The first information is used to indicate that a HARQ function of a HARQ process associated with a first configured grant is enabled or disabled, and the first configured grant is configured by using radio resource control RRC signaling.

It may be understood that the first configured grant is a configured grant. For example, refer to FIG. 2. The network device configures the configured grant by using the RRC signaling, that is, the first configured grant is semi-persistently scheduled. The configured grant includes a plurality of transmission opportunities that periodically appear, and the terminal device may perform data transmission by using the configured grant at each transmission opportunity.

The HARQ process associated with the first configured grant is a HARQ process used at a transmission opportunity of the first configured grant. Performing data transmission by using the first configured grant and by using one HARQ process at different transmission opportunities of the first configured grant may be understood as that: One data transmission, including data receiving and data sending performed by using the first configured grant, performed at one transmission opportunity of the first configured grant is identified by the HARQ process. It should be noted that the data transmission includes data and/or signaling transmission.

For example, if the first configured grant includes four transmission opportunities A, B, C, and D, and HARQ processes used at the four transmission opportunities are processes 1 to 4, HARQ processes associated with the first configured grant are the processes 1 to 4.

In a possible implementation, the first information may indicate HARQ function states of all HARQ processes associated with one configured grant configured by using RRC signaling, to ensure that HARQ function states of all HARQ processes associated with a same configured grant are consistent.

In addition, the HARQ process associated with the first configured grant is used by the terminal device and the network device to perform data transmission by using the first configured grant. Downlink transmission is used as an example. A HARQ process associated with the first configured grant is a HARQ process 1. The network device may use the HARQ process 1 to send new data to the terminal device or retransmit data to the terminal device by using the first configured grant. The terminal device may use the HARQ process 1 to receive, by using the first configured grant, the data sent by the network device, and feed back an ACK or a NACK to the network device for the HARQ process 1. The first information is indication information for the first configured grant, and each HARQ process associated with the first configured grant enables or disables a HARQ function according to an indication of the first information.

During specific implementation, the first information may be one bit, and the bit has two states: a first state and a second state. When the first information is in the first state, the first information may indicate that the HARQ function of the HARQ process associated with the first configured grant is enabled; when the first information is in the second state, the first information may indicate that the HARQ function of the HARQ process associated with the first configured grant is disabled. For example, the first state is "1", and the second state is "0".

Alternatively, the first information may be of a Boolean type. "True" is used to indicate that the HARQ function is in an enabled state, or "false" is used to indicate that the HARQ function is in a disabled state.

Alternatively, the first information may indicate the state of the HARQ function by using whether an information element or a field appears in signaling. For example, it is assumed that if the signaling includes a first information element, it indicates that the HARQ function is enabled; or if the signaling does not include a first information element, it indicates that the HARQ is disabled.

In a possible implementation, the first indication information may be included in RRC signaling used to configure the first configured grant.

In another possible implementation, the first indication information may be included in DCI for activating a configured grant. In another possible implementation, the first indication information may be included in a MAC CE (control element, control element) indicating a HARQ function state.

502: The terminal device receives the first information, and performs data transmission by using the first configured grant based on the first information.

Specifically, the terminal device may determine a HARQ function state of the first configured grant based on the first information. The HARQ function state of the first configured grant may be the HARQ function state indicated by the first information, namely, the HARQ function state of the HARQ process associated with the first configured grant. For example, when data is transmitted by using the first configured grant, the first information indicates whether a HARQ function of a HARQ process used at each transmission opportunity of the first configured grant is enabled.

After determining the HARQ function state of the first configured grant, each time the terminal device performs data transmission by using the first configured grant, the terminal device needs to associate the first configured grant with a specific HARQ process, that is, perform data transmission by using the HARQ process associated with the first configured grant, and perform the HARQ function based on the HARQ function state indicated by the first information.

Specifically, performing data transmission by using the HARQ process associated with the first configured grant may also be understood as identifying, by using the HARQ process associated with the first configured grant, data transmission performed on the first configured grant. The data transmission may include data receiving, data sending, or a corresponding HARQ feedback or retransmission operation.

In addition, performing the HARQ function based on the HARQ function state indicated by the first information may also be understood as performing a corresponding HARQ operation based on the HARQ function state of the first configured grant. For example, if the HARQ function of the first configured grant is in the enabled state, the terminal device or the network device performs HARQ feedback or HARQ retransmission on the data received on the first configured grant. In addition, the transmit end may buffer the data sent on the first configured grant, to perform data retransmission after receiving the NACK sent by the receive end. However, the receive end may buffer the data sent on the first configured grant, to combine and decode the data after receiving the retransmission of the transmit end.

It should be noted that the network device may configure available HARQ processes or a total quantity of HARQ processes for the terminal device, and may further specify a HARQ process for which a HARQ function is enabled and a HARQ process for which a HARQ function is disabled that are in the available HARQ processes.

For example, the method shown in FIG. 5 further include step 503: The terminal device receives second information from the network device, where the second information is used to indicate that a HARQ function of a first HARQ process is enabled and/or that a HARQ function of a second HARQ process is disabled. It should be noted that, in this embodiment of this application, the second information may be used to indicate a HARQ function state of a HARQ process. The first HARQ process and the second HARQ process are merely used as examples, and the second information may further indicate another HARQ process and a HARQ process function state of the HARQ process, for example, a third HARQ process described in this embodiment of this application.

The second information is indication information for a HARQ process. Compared with an indication granularity of the first information, an indication granularity of the second information is a HARQ process. Each HARQ process configured by using the second information may enable or disable a HARQ function according to the indication of the second information. Specifically, the second indication information may be included in RRC signaling used to configure a HARQ, may be included in RRC signaling used to configure a configured grant, or may be included in RRC signaling used to configure a physical downlink data channel (physical downlink shared channel, PDSCH) or a physical uplink data channel (physical uplink shared channel, PUSCH). Alternatively, the second information may be included in a MAC CE or DCI used to change a HARQ function state.

For example, refer to FIG. 3. The network device configures HARQ processes 1 to 8 for the terminal device by using the second information. The second information may further indicate that HARQ functions of the HARQ processes 1 to 4 are enabled, and that HARQ functions of the HARQ processes 5 to 8 are disabled.

In this embodiment of this application, the terminal device associates, with reference to the first information and the second information in the following two manners, the first configured grant with the HARQ processes whose HARQ function states are consistent with that of the first configured grant. The manners specifically include:

Manner 1: Application scopes or priorities of the first information and the second information may be limited. Based on this, the terminal device may determine the HARQ function state of the first configured grant in the following two manners: Manner a and Manner b.

Manner a: The second information is applicable only to a dynamically scheduled resource. A HARQ function state of a configured grant (for example, the first configured grant) is determined based on the first information, and a HARQ function state of a dynamic grant may be determined based on the second information. The HARQ function state of the dynamic grant may be a HARQ function state of a HARQ process associated with the dynamic grant. The HARQ process associated with the dynamic grant may be a HARQ process used when data transmission is performed by using the dynamic grant.

For dynamic scheduling, the network device may specify, in the DCI, a HARQ process used for a current scheduling, and the terminal device may determine, based on the second information, that a HARQ function state of the HARQ process used for the current scheduling is enabled or disabled.

Figure 6:
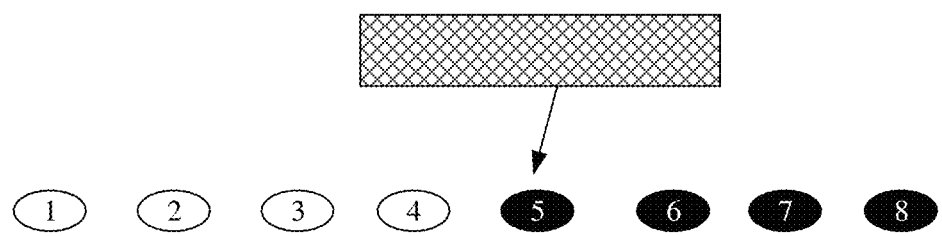
FIG. 6 to FIG. 11 each are a schematic diagram of a HARQ mapping method according to an embodiment of this application.

For example, in an example shown in FIG. 6, the network device configures HARQ processes 1 to 8 for the terminal device by using the second information. The second information may further indicate that HARQ functions of the HARQ processes 1 to 4 are enabled, and that HARQ functions of the HARQ processes 5 to 8 are disabled.

The network device further indicates, by using the DCI, a dynamically scheduled resource F and a process number "5" of a HARQ process used for data transmission on the dynamically scheduled resource F. Based on the second information, a HARQ function of the HARQ process 5 is disabled. Therefore, the HARQ function is disabled when data transmission is performed on the dynamically scheduled resource F by using the HARQ process 5. For example, the network device does not buffer data corresponding to the HARQ process 5, and the terminal device does not send HARQ feedback information to indicate a receiving status of the data corresponding to the HARQ process 5.

For semi-persistent scheduling, a base station may configure periodically distributed configured grants (configured grants) for data transmission. For a configured grant, the terminal device may calculate a HARQ process number for each transmission opportunity corresponding to the configured grant, and use a HARQ process corresponding to the process number to perform data transmission at the transmission opportunity by using the configured grant. In addition, it is determined, based on the first information, that a HARQ function state of the HARQ process used at each transmission opportunity corresponding to the configured grant is enabled or disabled.

In a possible implementation, the terminal device and the network device ignore an indication of the second information when performing data transmission by using the first configured grant, and perform a corresponding HARQ operation based on the HARQ function state indicated by the first information.

Optionally, the HARQ function of the HARQ process associated with the first configured grant may be changed based on the first information, and when the associated HARQ process stops being occupied by the dynamic grant again, a corresponding HARQ operation is performed based on the HARQ function state indicated by the second information.

Alternatively, the HARQ function of the HARQ process associated with the first configured grant is changed based on the first information, and when the associated HARQ process stops being occupied by the configured grant again, a corresponding HARQ operation is performed based on the HARQ function state indicated by the first information.

Figure 7:
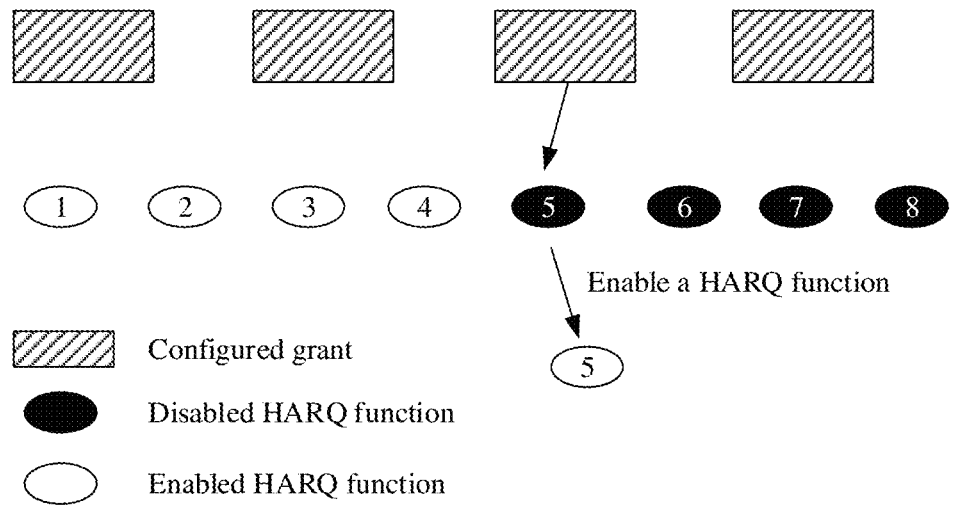

For example, refer to FIG. 7. It is assumed that the first information indicates that the HARQ function of the HARQ process associated with the first configured grant is enabled, the second information indicates that HARQ functions of HARQ processes 1 to 4 are enabled, and that HARQ functions of HARQ processes 5 to 8 are disabled. In this case, when using the process 5 at the $3^{rd}$ transmission opportunity of the first configured grant, the terminal device enables the HARQ function of the HARQ process 5 based on the first information.

Optionally, after the HARQ process 5 stops being occupied, the HARQ function of the HARQ process 5 is disabled based on the second information. That the HARQ process stops being occupied means that a data packet corresponding to the HARQ process is successfully received, or the HARQ process is used to transmit a new data packet.

Manner b: The second information is applicable to a dynamically scheduled resource and a configured grant. The terminal device performs data transmission by using the first configured grant based on the first information and the second information.

During specific implementation, the terminal device may determine, based on information having a higher priority in the first information and the second information, the HARQ function state of the HARQ process associated with the first configured grant. The priority may be predefined or preconfigured, or the priority may be indicated in the first information and the second information.

In a possible implementation, a priority of the first information is higher than a priority of the second information. For the configured grant, when an indication of the first information conflicts with an indication of the second information, the HARQ state of the HARQ process is determined based on the indication of the first information, and the indication of the second information is ignored.

A HARQ process 5 is used as an example. If the first information indicates that a HARQ function of the HARQ process 5 is enabled, and the second information indicates that the HARQ function of the HARQ process 5 is enabled, the HARQ function of the HARQ process 5 is enabled.

The HARQ process 5 is used as an example. If the first information indicates that a HARQ function of the HARQ process 5 is disabled, and the second information indicates that the HARQ function of the HARQ process 5 is enabled, the HARQ function of the HARQ process 5 is disabled.

The HARQ process 5 is used as an example. If the first information indicates that a HARQ function of the HARQ process 5 is disabled, and the second information indicates that the HARQ function of the HARQ process 5 is disabled, the HARQ function of the HARQ process 5 is disabled.

The HARQ process 5 is used as an example. If the first information indicates that a HARQ function of the HARQ process 5 is disabled, and the second information indicates that the HARQ function of the HARQ process 5 is enabled, the HARQ function of the HARQ process 5 is disabled.

In Manner 1, after determining the HARQ function state of the first configured grant, the terminal device may further calculate, in a calculation manner in a current technology, a process number of the HARQ process associated with the first configured grant. When transmitting data by using the first configured grant and by using the corresponding HARQ process, the terminal device may perform the corresponding HARQ operation based on the HARQ function state of the first configured grant.

Specifically, the HARQ process number associated with the first configured grant is calculated according to the foregoing formula (1), and when a HARQ process (for example, the third HARQ process in this embodiment of this application) corresponding to the HARQ process number is used to perform data transmission by using the first configured grant, a HARQ function of the HARQ process corresponding to the HARQ process number is enabled or a HARQ function of the HARQ process corresponding to the HARQ process number is disabled based on the HARQ function state of the first configured grant.

For example, based on an identifier of a symbol in which the first configured grant is located and with reference to the foregoing formula (1), it is obtained, through calculation, that the HARQ process number is "5". Assuming that it is determined that the HARQ function state of the first configured grant is enabled, when data transmission is performed by using the first configured grant, a HARQ process (for example, the third HARQ process in this embodiment of this application) corresponding to the process number "5" may be used to identify one data transmission, and the HARQ function is enabled. For example, the terminal device feeds back an ACK or a NACK for current data transmission.

Manner 2: Application scopes or priorities of the first information and the second information are not limited. The terminal device may determine the HARQ function state of the first configured grant based on the first information, calculate an index of a HARQ process number associated with the first configured grant, determine a HARQ process based on the index of the HARQ process number, and associate the first configured grant with a HARQ process whose HARQ function state is consistent with that of the first configured grant.

For example, an index of a third HARQ process associated with the first configured grant is calculated, and the third HARQ process may be determined based on the index of the third HARQ process. Alternatively, the third HARQ process may be associated with the first configured grant, and when data transmission is performed at a transmission opportunity of the first configured grant, the third HARQ process is used to identify the data transmission.

It should be noted that, that the third HARQ process is associated with the first configured grant may be understood as that the first configured grant is mapped to the third HARQ process, or that the third HARQ process is associated with one data transmission performed on the first configured grant.

During specific implementation, it may be determined that the index of the third HARQ process is an index for a first process set, and is used to indicate a location of the third HARQ process in the first process set.

In a possible implementation, the first process set is a set of HARQ processes whose HARQ function states are consistent with that of the first configured grant. For example, HARQ functions of some processes in HARQ processes configured by the network device for a HARQ entity of the terminal device are enabled, and HARQ functions of some other HARQ processes are disabled. In this case, the first process set is a process set including processes whose HARQ functions are enabled or a process set including processes whose HARQ functions are disabled. Specifically, if the first information indicates that the HARQ function is enabled, the first process set is a set of HARQ processes, in available HARQ processes configured by using RRC signaling, whose HARQ functions are enabled. If the first information indicates that the HARQ function is disabled, the first process set is a set of HARQ processes, in the available HARQ processes configured by using the RRC signaling, whose HARQ functions are disabled.

Specifically, the index of the HARQ process may be determined in the following Manner E, Manner F, and Manner G.

Manner E: The index of the HARQ process is calculated based on a quantity M of HARQ processes in the first process set.

For example, an index i of the third HARQ process is determined according to a formula (2), and i meets the following formula (2):

$$i = [\text{floor}\ (T/P)]\ \text{modulo}\ M \qquad (2)$$

T is an identifier of a time unit in which the first configured grant is located, the time unit is a symbol, a slot, or a subframe, P is a periodicity of the configured grant, M is a quantity of processes in the first process set, floor is a floor operation, and modulo is a modulo operation.

In this manner, the index of the HARQ process does not exceed the quantity M of the HARQ processes in the first process set. After the index i is determined, the index i needs to be mapped to the HARQ process, and a quantity of indexes does not exceed the quantity of HARQ processes in the first set.

In a possible implementation, the third HARQ process is the $i^{th}$ HARQ process in the first process set. Specifically, the M HARQ processes in the first process set are arranged in a specific order, and the $i^{th}$ HARQ process is the $i^{th}$ HARQ process in the sorted HARQ processes. For example, the M HARQ processes are arranged in descending order of process numbers, or the M HARQ processes are arranged in ascending order of process numbers.

Figure 8:
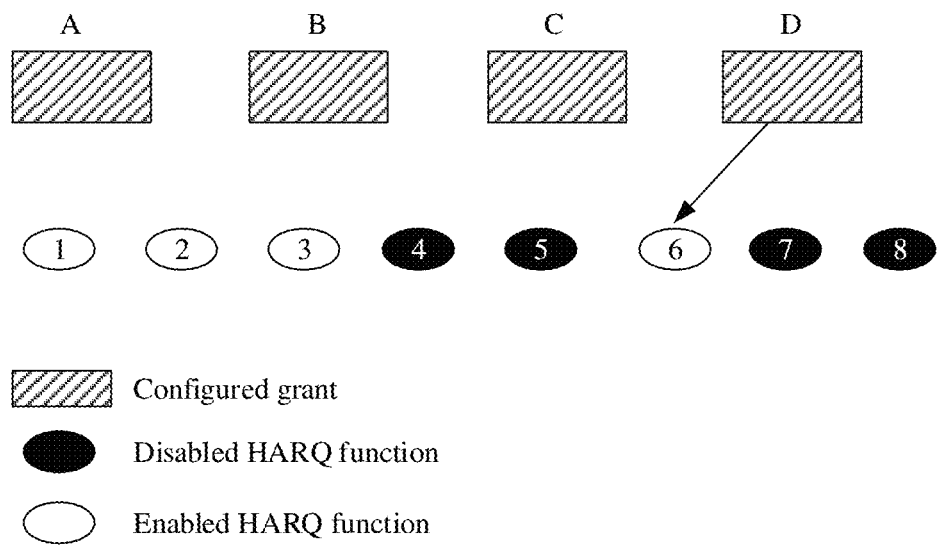

For example, refer to FIG. 8. The first configured grant includes four transmission opportunities A, B, C, and D, and the network device configures HARQ processes 1 to 8 for the terminal device by using RRC signaling. HARQ functions of the HARQ processes 1 to 3 and the HARQ process 6 are enabled, and HARQ functions of the HARQ processes 4 and 5 and the HARQ processes 7 and 8 are disabled.

It is assumed that the first indication information indicates that the HARQ function of the HARQ process associated with the first configured grant is enabled. When it is obtained, through calculation according to the formula (2), that an index i of a third HARQ process associated with the transmission opportunity D is "4", it indicates that the third HARQ process is the $4^{th}$ HARQ process in the first process set. In the example shown in FIG. 6, the first process set is a set of HARQ processes whose HARQ functions are enabled in the HARQ processes 1 to 8. To be specific, the first process set is a set of the HARQ processes 1 to 3 and the HARQ process 6. In ascending order of process numbers, the $4^{th}$ HARQ process in the first process set is the HARQ process 6, that is, the third HARQ process is the HARQ process 6. The HARQ process 6 is actually used at the transmission opportunity D.

Manner F: The index of the HARQ process is calculated based on a maximum quantity N of HARQ processes that are configured by using RRC signaling, where N>M.

For example, an index j of the third HARQ process is determined according to a formula (3), and j meets the following formula (3):

$$j=[\text{floor }(T/P)] \text{ modulo } N \qquad (3)$$

T is an identifier of a time unit in which the first configured grant is located, the time unit is a symbol, a slot, or a subframe, P is a periodicity of the configured grant, N is a total quantity of HARQ processes configured by using RRC signaling, floor is a floor operation, and modulo is a modulo operation. The time unit in which the first configured grant is located may be a time unit in which a transmission opportunity of the first configured grant is located.

In this manner, an index j, obtained through calculation, of the HARQ process may be greater than the quantity M of HARQ processes in the first process set. T is an identifier of a time unit in which the first configured grant is located, the time unit is a symbol, a slot, or a subframe, P is a periodicity of the configured grant, N is a total quantity of HARQ processes configured by using RRC signaling, floor is a floor operation, and modulo is a modulo operation. The time unit in which the first configured grant is located may be a time unit in which a transmission opportunity of the first configured grant is located.

(1) When j is not greater than M, the third HARQ process is the $j^{th}$ HARQ process in the first process set. Specifically, the M HARQ processes in the first process set are arranged in a specific order, and the $j^{th}$ HARQ process is the $j^{th}$ HARQ process in the sorted HARQ processes. For example, the M HARQ processes are arranged in descending order of process numbers, or the M HARQ processes are arranged in ascending order of process numbers.

Figure 9:
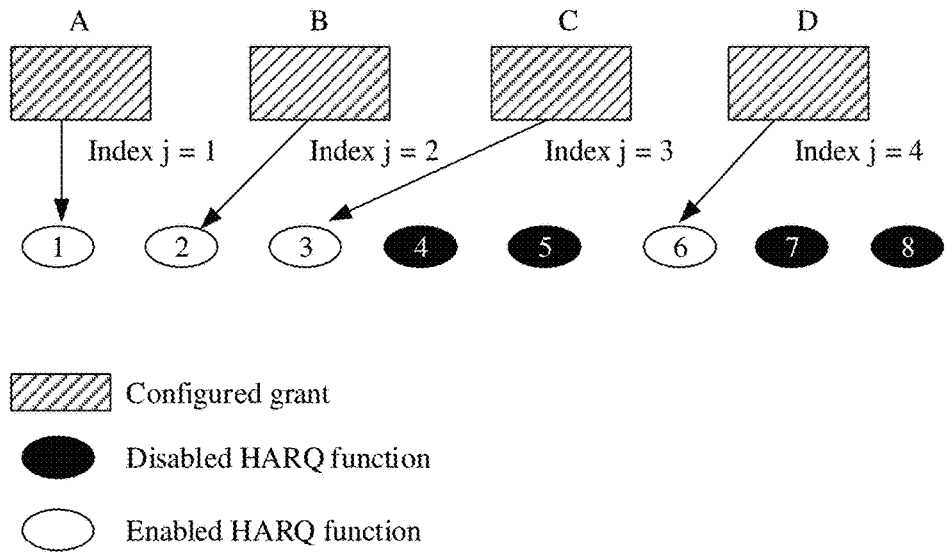

For example, refer to FIG. 9. The first configured grant includes four transmission opportunities A, B, C, and D, and the network device configures HARQ processes 1 to 8 for the terminal device by using RRC signaling. HARQ functions of the HARQ processes 1 to 3 and the HARQ process 6 are enabled, and HARQ functions of the HARQ processes 4 and 5 and the HARQ processes 7 and 8 are disabled.

It is assumed that the first indication information indicates that the HARQ function of the HARQ process associated with the first configured grant is enabled. The first process set is a set of the HARQ processes 1 to 3 and the HARQ process 6. It is obtained, through calculation according to the formula (3), that indexes j of HARQ processes used by the terminal device at the four transmission opportunities are respectively "1", "2", "3", and "4, and j does not exceed the quantity "4" of HARQ processes in the first process set.

(2) When j is greater than M, a modulo operation further needs to be performed on the index j, so that the first configured grant is mapped to the HARQ process in the first process set.

Figure 10:
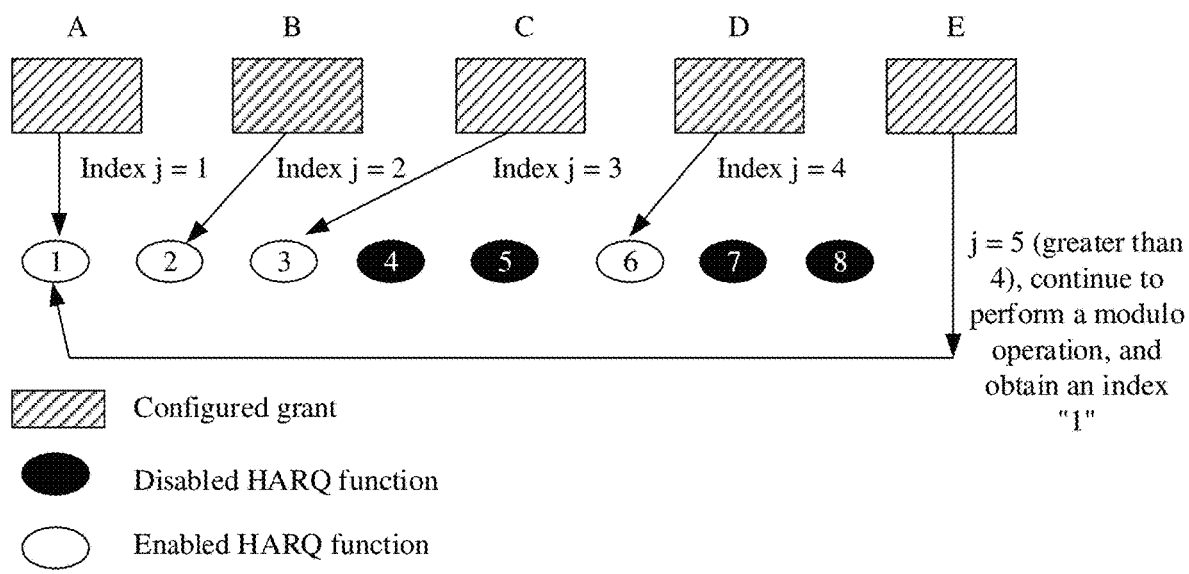

For example, refer to FIG. 10. The first configured grant includes five transmission opportunities A, B, C, D, and E, and the network device configures HARQ processes 1 to 8 for the terminal device by using RRC signaling. HARQ functions of the HARQ processes 1 to 3 and the HARQ process 6 are enabled, and HARQ functions of the HARQ processes 4 and 5 and the HARQ processes 7 and 8 are disabled.

It is assumed that the first indication information indicates that the HARQ function of the HARQ process associated with the first configured grant is enabled. It is obtained, through calculation according to the formula (4), that an index j of a HARQ process associated with the transmission opportunity E is 5. The first process set is a set of HARQ processes whose HARQ functions are enabled in the HARQ processes 1 to 8. To be specific, the first process set is a set of the HARQ processes 1 to 3 and the HARQ process 6. It can be learned that the index "5" of the third HARQ process exceeds the quantity "4" of HARQ processes in the first process set, and a modulo operation may continue to be performed on 5, to obtain the index "1" of the third HARQ process. For example, 5 modulo 4=1, that is, the index t of the third HARQ process is 1, indicating that the third HARQ process is the $1^{st}$ HARQ process in the first process set. In the example shown in FIG. 6, in ascending order of process numbers, the $1^{st}$ HARQ process in the first process set is the HARQ process 1, that is, the third HARQ process is the HARQ process 1. The HARQ process 1 is actually used at the transmission opportunity D.

Manner G: An index t of the HARQ process is obtained through calculation according to the formula (4), and the index t does not exceed the quantity M of HARQ processes in the first process set. The first configured grant may be mapped to a HARQ process in the first process set based on the index t.

For example, the index t of the third HARQ process is determined according to a formula (4), and t meets the following formula (4):

$$t=\{[\text{floor }(T/P)] \text{ modulo } N\} \text{ modulo } M \qquad (4)$$

T is an identifier of a time unit in which the first configured grant is located, the time unit is a symbol, a slot, or a subframe, P is a periodicity of the configured grant, N is a total quantity of HARQ processes configured by using RRC signaling, floor is a floor operation, modulo is a modulo operation, and M is a quantity of processes in the first process set.

In a possible implementation, the third HARQ process is the $t^{th}$ HARQ process in the first process set. Specifically, the M HARQ processes in the first process set are arranged in a specific order, and the $t^{th}$ HARQ process is the $t^{th}$ HARQ process in the sorted HARQ processes. For example, the M HARQ processes are arranged in descending order of process numbers, or the M HARQ processes are arranged in ascending order of process numbers.

Figure 11:
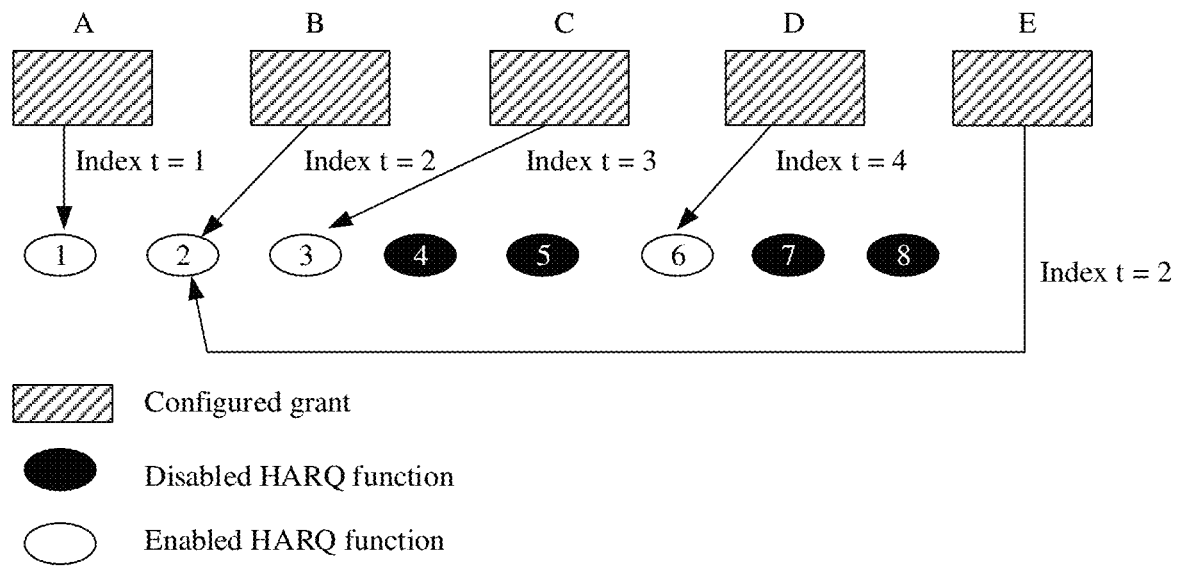

For example, refer to FIG. 11. The first configured grant includes four transmission opportunities A, B, C, D, and E, and the network device configures HARQ processes 1 to 8 for the terminal device by using RRC signaling. HARQ functions of the HARQ processes 1 to 3 and the HARQ process 6 are enabled, and HARQ functions of the HARQ processes 4 and 5 and the HARQ processes 7 and 8 are disabled.

It is assumed that the first indication information indicates that the HARQ function of the HARQ process associated with the first configured grant is enabled. When it is obtained, through calculation according to the formula (4), that an index t of a HARQ process used at the transmission opportunity E is "2", that is, an index t of the third HARQ process is 2, it indicates that the third HARQ process is the $2^{nd}$ HARQ process in the first process set. In an example shown in FIG. 11, in ascending order of process numbers, the $2^{nd}$ HARQ process in the first process set is the HARQ process 2, that is, the third HARQ process is the HARQ process 2. The HARQ process 2 is actually used at the transmission opportunity D.

The foregoing three determining manners are merely possible examples. During specific implementation, the terminal device may determine the process number of the third HARQ process by using another possible method.

It should be noted that Manner 1, Manner 2, Manner a, Manner b, Manner E, Manner F, and Manner G in this embodiment of this application are not limited to being performed by the terminal device. The network device may also perform Manner 1, Manner 2, Manner a, Manner b, Manner E, Manner F, and Manner G, to determine the HARQ function state of the first configured grant, and associate the first configured grant with a HARQ process whose HARQ function state is consistent with that of the first configured grant.

In the method provided in this embodiment of this application, the first information may be used to ensure that HARQ function states of all HARQ processes associated with a same configured grant are consistent. For example, when the terminal device transmits data by using the configured grant, all HARQ functions of the HARQ processes are enabled, or when the terminal device transmits data by using the configured grant, all HARQ functions of the HARQ processes are disabled. It can be learned that in this embodiment of this application, it can be ensured that HARQ function states of HARQ processes used at a plurality of transmission opportunities of a same configured grant configured by using the RRC signaling are consistent, and the terminal device performs a same HARQ operation when performing a same service by using the same configured grant, to better match a service requirement of the terminal device and improve data transmission performance Each transmission opportunity of the configured grant corresponds to one HARQ process.

Figure 12:
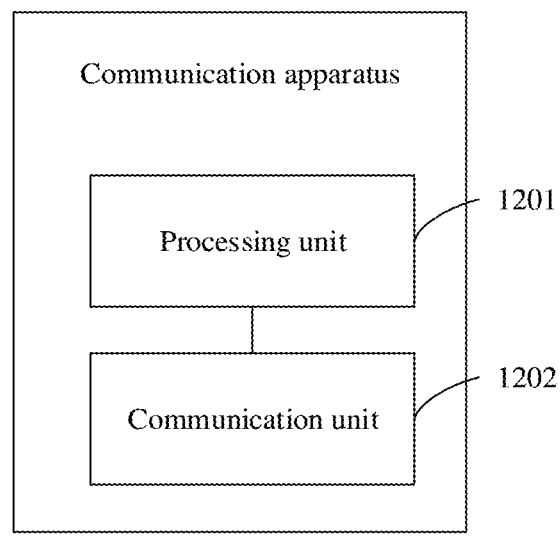
FIG. 12 to FIG. 15 each are another block diagram of a structure of a communication apparatus according to an embodiment of this application.

In a case that functional modules are obtained through division based on corresponding functions, FIG. 12 is a possible schematic diagram of a structure of the communication apparatus in the foregoing embodiments. The communication apparatus shown in FIG. 12 may be the terminal device in embodiments of this application, may be a component that implements the foregoing methods in the terminal device, or may be a chip used in the terminal device. The chip may be a system-on-a-chip (System-On-a-Chip, SoC), a baseband chip having a communication function, or the like. As shown in FIG. 12, the communication apparatus includes a processing unit 1201 and a communication unit 1202. The processing unit may be one or more processors, and the communication unit may be a transceiver.

The processing unit 1201 is configured to support the terminal device in performing step 502, and/or is configured to perform another process of the technology described in this specification.

The communication unit 1202 is configured to support communication between the terminal device and another communication apparatus, for example, support the terminal device in performing step 501, and/or is configured to perform another process of the technology described in this specification.

It should be noted that all related content of the steps in the foregoing method embodiments may be cited in function descriptions of corresponding functional modules. Details are not described herein again.

Figure 13:
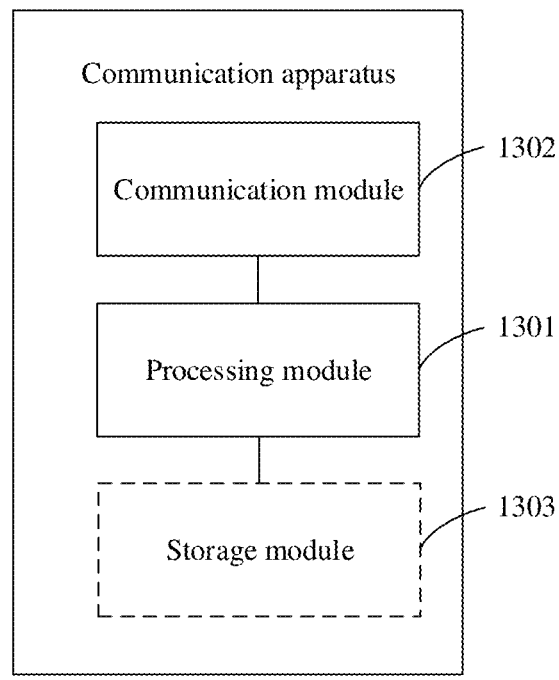

For example, when an integrated unit is used, a schematic diagram of a structure of a communication apparatus according to an embodiment of this application is shown in FIG. 13. In FIG. 13, the communication apparatus includes a processing module 1301 and a communication module 1302. The processing module 1301 is configured to control and manage actions of the communication apparatus, for example, perform the step performed by the processing unit 1201, and/or another process of the technology described in this specification. The communication module 1302 is configured to perform the step performed by the communication unit 1202, and support interaction between the communication apparatus and another device, for example, interaction with another device apparatus. Optionally, as shown in FIG. 13, the communication apparatus may further include a storage module 1303, and the storage module 1303 is configured to store program code and data of the communication apparatus.

When the processing module 1301 is a processor, the communication module 1302 is a transceiver, and the storage module 1303 is a memory, the communication apparatus is the communication apparatus shown in FIG. 4*a*.

Figure 14:
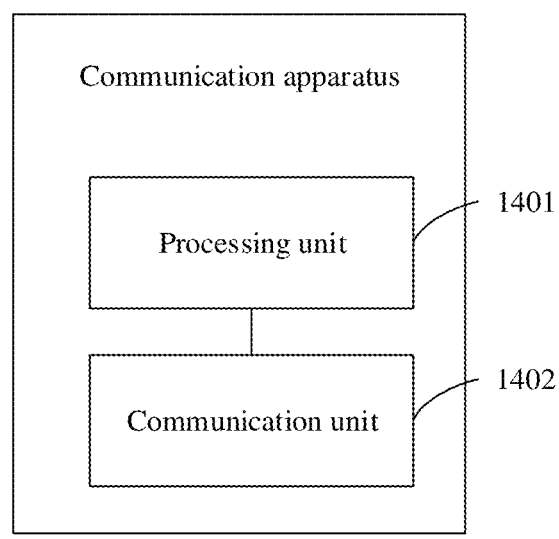

In a case that functional modules are obtained through division based on corresponding functions, FIG. 14 is a possible schematic diagram of a structure of the communication apparatus in the foregoing embodiments. The communication apparatus shown in FIG. 14 may be the network device in embodiments of this application, may be a component that implements the foregoing methods in the network device, or may be a chip used in the network device. The chip may be a system-on-a-chip (System-On-a-Chip, SoC), a baseband chip having a communication function, or the like. As shown in FIG. 14, the communication apparatus includes a processing unit 1401 and a communication unit 1402. The processing unit 1401 may be one or more processors, and the communication unit 1402 may be a transceiver.

The processing unit 1401 is configured to support the network device in generating first information and second information, and/or is configured to perform another process of the technology described in this specification.

The communication unit 1402 is configured to support communication between the network device and another communication apparatus, for example, support the network device in performing step 501, and/or is configured to perform another process of the technology described in this specification.

It should be noted that all related content of the steps in the foregoing method embodiments may be cited in function descriptions of corresponding functional modules. Details are not described herein again.

Figure 15:
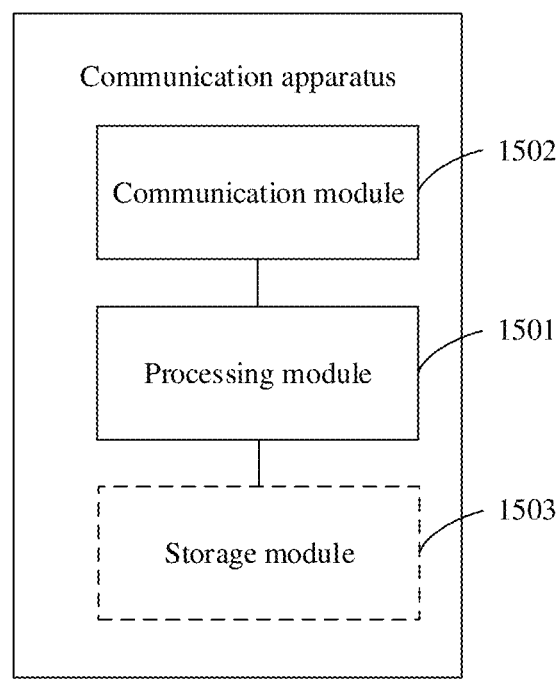

For example, when an integrated unit is used, a schematic diagram of a structure of a communication apparatus according to an embodiment of this application is shown in FIG. 15. In FIG. 15, the communication apparatus includes a processing module 1501 and a communication module 1502. The processing module 1501 is configured to control and manage actions of the communication apparatus, for example, perform the step performed by the processing unit 1401, and/or another process of the technology described in this specification. The communication module 1502 is configured to perform the step performed by the communication unit 1402, and support interaction between the communication apparatus and another device, for example, interaction with another first network device apparatus. Optionally, as shown in FIG. 15, the communication apparatus may further include a storage module 1503, and the storage module 1503 is configured to store program code and data of the communication apparatus.

When the processing module 1501 is a processor, the communication module 1502 is a transceiver, and the storage module 1503 is a memory, the communication apparatus is the communication apparatus shown in FIG. 4b.

An embodiment of this application provides a computer-readable storage medium. The computer-readable storage medium stores instructions. The instructions are used to perform the method shown in FIG. 5.

An embodiment of this application provides a computer program product including instructions. When the computer program product runs on a communication apparatus, the communication apparatus is enabled to perform the method shown in FIG. 5.

An embodiment of this application provides a wireless communication apparatus. The wireless communication apparatus stores instructions. When the wireless communication apparatus runs on the communication apparatuses shown in FIG. 4a, FIG. 4b, and FIG. 12 to FIG. 15, the communication apparatus is enabled to perform the method shown in FIG. 5. The wireless communication apparatus may be a chip.

An embodiment of this application further provides a communication system, including a terminal device and a network device. For example, the terminal device may be the communication apparatus shown in FIG. 4a, FIG. 12, or FIG. 13, and the network device may be the communication apparatus shown in FIG. 4b, FIG. 14, or FIG. 15.

Based on the descriptions of the foregoing implementations, a person skilled in the art can clearly understand that, for ease and brevity of description, division into the foregoing functional modules is merely used as an example for illustration. In actual application, the foregoing functions can be allocated to different functional modules and implemented as required. In other words, an inner structure of an apparatus is divided into different functional modules to implement all or some of the functions described above.

The processor in embodiments of this application may include but is not limited to at least one of the following computing devices that run software: a central processing unit (central processing unit, CPU), a microprocessor, a digital signal processor (DSP), a microcontroller (microcontroller unit, MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, a SoC (system-on-a-chip) may include the processor and another circuit (for example, an encoding/decoding circuit, a hardware acceleration circuit, or various buses and interface circuits). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (field programmable gate array, FPGA), a PLD (programmable logic device), or a logic circuit that implements a dedicated logic operation.

The memory in embodiments of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

In this application, "at least one" refers to one or more. "A plurality of" means two or more than two. The term "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between associated objects. "At least one item (piece) of the following" or a similar expression thereof refers to any combination of these items, including any combination of singular items (pieces) or plural items (pieces). For example, at least one (piece) of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

In the several embodiments provided in this application, it should be understood that the disclosed database access apparatus and method may be implemented in other manners. For example, the described database access apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electrical, mechanical, or other forms.

The units described as separate parts may or may not be physically separate, and parts displayed as units may be one or more physical units, and may be located in one place or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, wherein the method comprises:
   receiving, by a terminal device, first information, wherein the first information is useable to indicate that a hybrid automatic repeat request (HARQ) function of a HARQ process associated with a first configured grant is enabled or disabled, and the first configured grant is configured by radio resource control (RRC) signaling;
   performing, by the terminal device, data transmission by the first configured grant based on the first information; and
   determining a third HARQ process, wherein the third HARQ process is associated with the first configured grant, and a third HARQ function state of the third HARQ process is consistent with a first HARQ function state of the first configured grant, wherein
   the third HARQ process is an $i^{th}$ HARQ process, a $j^{th}$ HARQ process, or a $t^{th}$ HARQ process in a first process set, wherein
   i=[floor (T/P)] modulo M,
   j=[floor (T/P)] modulo N,
   t={[floor (T/P)] modulo N} modulo M, and
   the first process set is a set of HARQ processes whose HARQ function states are consistent with that of the first configured grant, T is an identifier of a time unit in which the first configured grant is located, the time unit is a symbol, a slot, or a subframe, P is a periodicity of the configured grant, M is a quantity of processes in the first process set, N is a total quantity of HARQ processes configured by the RRC signaling, floor is a floor operation, and modulo is a modulo operation.

2. The method according to claim 1, wherein the method further comprises:
   receiving second information, wherein the second information is useable to indicate that a first HARQ function of a first HARQ process is at least one of enabled or that a second HARQ function of a second HARQ process is disabled.

3. The method according to claim 2, wherein the second information is applicable only to a dynamically scheduled resource, and the method further comprises:
   ignoring an indication of the second information in response to performing data transmission by the first configured grant.

4. The method according to claim 2, wherein the performing data transmission by the first configured grant based on the first information comprises:
   performing data transmission by the first configured grant based on the first information and the second information.

5. The method according to claim 4, wherein a priority of the first information is higher than a priority of the second information.

6. A data transmission method, wherein the method comprises:
   sending, by a network device, first information to a terminal device, wherein the first information is useable to indicate that a hybrid automatic repeat request (HARQ) function of a HARQ process associated with a first configured grant is enabled or disabled, and the first configured grant is configured by radio resource control (RRC) signaling;
   performing, by the network device, data transmission with the terminal device by the first configured grant based on the first information; and
   determining a third HARQ process, wherein the third HARQ process is associated with the first configured grant, and a third HARQ function state of the third HARQ process is consistent with a first HARQ function state of the first configured grant, wherein
   the third HARQ process is an $i^{th}$ HARQ process, a $j^{th}$ HARQ process, or a $t^{th}$ HARQ process in a first process set, wherein
   i=[floor (T/P)] modulo M,
   j=[floor (T/P)] modulo N,
   t={[floor (T/P)] modulo N} modulo M, and
   the first process set is a set of HARQ processes whose HARQ function states are consistent with that of the first configured grant, T is an identifier of a time unit in which the first configured grant is located, the time unit is a symbol, a slot, or a subframe, P is a periodicity of the configured grant, M is a quantity of processes in the first process set, N is a total quantity of HARQ processes configured by the RRC signaling, floor is a floor operation, and modulo is a modulo operation.

7. The method according to claim 6, wherein the method further comprises:
   sending, by the network device, second information to the terminal device, wherein the second information is useable to indicate that a first HARQ function of a first HARQ process is at least one of enabled or that a second HARQ function of a second HARQ process is disabled.

8. The method according to claim 7, wherein the second information is applicable only to a dynamically scheduled resource, and the method further comprises:
   ignoring an indication of the second information in response to performing data transmission by the first configured grant.

9. The method according to claim 7, wherein the performing data transmission with the terminal device by the first configured grant based on the first information comprises:
   performing data transmission by the first configured grant based on the first information and the second information.

10. The method according to claim 9, wherein a priority of the first information is higher than a priority of the second information.

11. An apparatus, comprising:
    one or more processors; and one or more non-transitory memories coupled to the one or more processors, and configured to store non-transitory instructions for execution by the one or more processors to cause the apparatus to perform operations comprising:

receiving first information, wherein the first information is useable to indicate that a hybrid automatic repeat request (HARQ) function of a HARQ process associated with a first configured grant is enabled or disabled, and the first configured grant is configured by radio resource control (RRC) signaling;

performing data transmission by the first configured grant based on the first information; and determining a third HARQ process, wherein the third HARQ process is associated with the first configured grant, and a third HARQ function state of the third HARQ process is consistent with a first HARQ function state of the first configured grant, wherein the third HARQ process is an $i^{th}$ HARQ process, a $j^{th}$ HARQ process, or a $t^{th}$ HARQ process in a first process set, wherein i=[floor (T/P)] modulo M, j=[floor (T/P)] modulo N, t={[floor (T/P)] modulo N} modulo M, and the first process set is a set of HARQ processes whose HARQ function states are consistent with that of the first configured grant, T is an identifier of a time unit in which the first configured grant is located, the time unit is a symbol, a slot, or a subframe, P is a periodicity of the configured grant, M is a quantity of processes in the first process set, N is a total quantity of HARQ processes configured by the RRC signaling, floor is a floor operation, and modulo is a modulo operation.

12. The apparatus according to claim 11, wherein the method further comprises:

receiving second information, wherein the second information is useable to indicate that a first HARQ function of a first HARQ process is at least one of enabled or that a second HARQ function of a second HARQ process is disabled.

13. The apparatus according to claim 12, wherein the second information is applicable only to a dynamically scheduled resource, and the method further comprises:

ignoring an indication of the second information in response to performing data transmission by the first configured grant.

14. The apparatus according to claim 12, wherein the performing data transmission by using the first configured grant based on the first information comprises:

performing data transmission by the first configured grant based on the first information and the second information.

15. The apparatus according to claim 14, wherein a priority of the first information is higher than a priority of the second information.

* * * * *